(12) United States Patent
Belz et al.

(10) Patent No.: US 7,458,520 B2
(45) Date of Patent: Dec. 2, 2008

(54) ELECTRONIC PROPORTIONING VALVE

(75) Inventors: Jeffrey Belz, Eastpointe, MI (US); Randall Paul Schmitt, Clinton Township, MI (US); Jeff Iott, Monroe, MI (US); Cliff Chiang, Canton, MI (US); Thomas Alan Barnett, Ypsilanti, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 480 days.

(21) Appl. No.: 11/109,281

(22) Filed: Apr. 19, 2005

(65) Prior Publication Data

US 2006/0231638 A1    Oct. 19, 2006

(51) Int. Cl.
    *G05D 23/13* (2006.01)
(52) U.S. Cl. .................. 236/12.12; 236/12.15
(58) Field of Classification Search .............. 236/12.11, 236/12.12, 12.15
    See application file for complete search history.

(56) References Cited

U.S. PATENT DOCUMENTS

| | | |
|---|---|---|
| 3,565,791 A | 2/1971 | Urquhart et al. |
| 3,642,021 A | 2/1972 | Muller et al. |
| 3,685,541 A | 8/1972 | Caparone et al. |
| 3,695,903 A | 10/1972 | Telkes et al. |
| 3,721,386 A | 3/1973 | Brick et al. |
| 3,750,701 A | 8/1973 | Botnick |
| 3,952,796 A | 4/1976 | Larson |
| 4,051,869 A | 10/1977 | Holt et al. |
| 4,102,354 A | 7/1978 | Natale |
| 4,121,761 A | 10/1978 | Nolden |
| 4,150,817 A | 4/1979 | Regelin et al. |
| 4,166,575 A | 9/1979 | Sassi |
| 4,170,245 A | 10/1979 | Haley |
| 4,181,252 A | 1/1980 | Nolden |
| 4,185,771 A | 1/1980 | Killias |
| 4,189,792 A | 2/1980 | Veach |
| 4,222,410 A | 9/1980 | Geimer |
| 4,227,548 A | 10/1980 | Botnick |
| 4,241,868 A | 12/1980 | Perkins |
| 4,258,751 A | 3/1981 | Humpert |
| 4,270,570 A | 6/1981 | Kolze |
| 4,322,031 A | 3/1982 | Gehlert |
| 4,330,081 A | 5/1982 | McMillan |
| 4,359,186 A | 11/1982 | Kiendl |
| 4,402,455 A | 9/1983 | Kolt |
| 4,406,398 A | 9/1983 | Perkins |
| 4,409,694 A | 10/1983 | Barrett, Sr. et al. |
| 4,420,811 A | 12/1983 | Tarnay et al. |
| 4,421,269 A | 12/1983 | Ts'ao |
| 4,429,422 A | 2/1984 | Wareham |
| 4,444,357 A | 4/1984 | Lynch et al. |
| 4,455,475 A | 6/1984 | Giorgetti |

(Continued)

FOREIGN PATENT DOCUMENTS

DE    3407796 A1    9/1985

(Continued)

*Primary Examiner*—Marc E Norman
(74) *Attorney, Agent, or Firm*—Leon E. Redman; Lloyd D. Doigan

(57) ABSTRACT

An electronic proportioning valve for connection to a cold water source, a hot water source and a mixed water outlet and for providing a mixed water of a desired water temperature and flow rate to the mixed water outlet.

27 Claims, 10 Drawing Sheets

U.S. PATENT DOCUMENTS

| | | |
|---|---|---|
| 4,478,249 A | 10/1984 | Fleischmann |
| 4,503,575 A | 3/1985 | Knoop et al. |
| 4,524,906 A | 6/1985 | Kenyon et al. |
| 4,528,709 A | 7/1985 | Getz |
| 4,541,562 A | 9/1985 | Zukausky |
| 4,558,817 A | 12/1985 | Kiendl |
| 4,560,284 A | 12/1985 | Chen |
| 4,563,780 A | 1/1986 | Pollack |
| 4,570,848 A | 2/1986 | McLellan |
| 4,572,238 A | 2/1986 | Stenlund |
| 4,575,262 A | 3/1986 | Andersen |
| 4,580,544 A | 4/1986 | Walker |
| 4,581,707 A | 4/1986 | Millar |
| 4,604,764 A | 8/1986 | Enzo |
| 4,618,091 A | 10/1986 | Buzzi |
| 4,630,940 A | 12/1986 | Ostertag et al. |
| 4,635,844 A | 1/1987 | Barrett, Sr. et al. |
| 4,645,489 A | 2/1987 | Krumme et al. |
| 4,674,678 A | 6/1987 | Knebel et al. |
| 4,682,626 A | 7/1987 | Bergmann |
| 4,682,728 A | 7/1987 | Oudenhoven et al. |
| 4,693,415 A | 9/1987 | Sturm |
| 4,694,512 A | 9/1987 | Knebel et al. |
| 4,700,884 A | 10/1987 | Barrett et al. |
| 4,700,885 A | 10/1987 | Knebel |
| 4,706,703 A | 11/1987 | Takeuchi et al. |
| 4,709,728 A | 12/1987 | Ying-Chung |
| 4,711,392 A | 12/1987 | Kidouchi et al. |
| 4,713,525 A | 12/1987 | Eastep |
| 4,735,357 A | 4/1988 | Gregory et al. |
| 4,739,923 A | 4/1988 | Tsutsui et al. |
| 4,740,089 A | 4/1988 | Fiorentini |
| 4,742,456 A | 5/1988 | Kamena |
| 4,756,030 A | 7/1988 | Juliver |
| 4,757,943 A | 7/1988 | Sperling et al. |
| 4,762,273 A | 8/1988 | Gregory et al. |
| 4,763,681 A | 8/1988 | Cuny et al. |
| 4,768,705 A | 9/1988 | Tsutsui et al. |
| 4,842,191 A | 6/1989 | Bergmann |
| 4,854,498 A | 8/1989 | Stayton |
| 4,854,499 A | 8/1989 | Neuman |
| 4,863,098 A | 9/1989 | Kolze et al. |
| 4,867,375 A | 9/1989 | Ueki et al. |
| 4,869,427 A | 9/1989 | Kawamoto et al. |
| 4,870,986 A | 10/1989 | Barrett et al. |
| 4,873,830 A | 10/1989 | Blattler |
| 4,875,623 A | 10/1989 | Garris |
| 4,886,207 A | 12/1989 | Lee et al. |
| 4,896,101 A | 1/1990 | Cobb |
| 4,896,658 A | 1/1990 | Yonekubo et al. |
| 4,901,915 A | 2/1990 | Sakakibara |
| 4,909,435 A | 3/1990 | Kidouchi et al. |
| 4,921,162 A | 5/1990 | Blattler |
| 4,923,116 A | 5/1990 | Homan |
| 4,924,900 A | 5/1990 | Taube, Sr. et al. |
| 4,926,897 A | 5/1990 | Perrott |
| 4,928,732 A | 5/1990 | Hu |
| 4,931,938 A | 6/1990 | Hass |
| 4,936,347 A | 6/1990 | Oracz et al. |
| 4,941,608 A | 7/1990 | Shimizu et al. |
| 4,942,739 A | 7/1990 | Uda et al. |
| 4,945,943 A | 8/1990 | Cogger |
| 4,953,236 A | 9/1990 | Lee et al. |
| 4,955,535 A | 9/1990 | Tsutsui et al. |
| 4,965,894 A | 10/1990 | Baus |
| 4,967,794 A | 11/1990 | Tsutsui et al. |
| 4,968,152 A | 11/1990 | Bergmann |
| 4,969,576 A | 11/1990 | Merrill et al. |
| 4,969,598 A | 11/1990 | Garrs |
| 4,971,106 A | 11/1990 | Tsutsui et al. |
| 4,976,460 A | 12/1990 | Newcombe et al. |
| 4,978,058 A | 12/1990 | Duncan et al. |
| 4,984,314 A | 1/1991 | Weigert |
| 4,986,470 A | 1/1991 | Yamazaki |
| 4,994,792 A | 2/1991 | Ziegler, Jr. |
| 5,032,992 A | 7/1991 | Bergmann |
| 5,033,671 A | 7/1991 | Shiba et al. |
| 5,038,420 A | 8/1991 | Chen |
| 5,050,062 A | 9/1991 | Hass |
| 5,050,641 A | 9/1991 | Shwu-Fen |
| 5,058,389 A | 10/1991 | Yasuda et al. |
| 5,058,624 A | 10/1991 | Kolze |
| 5,058,804 A | 10/1991 | Yonekubo et al. |
| 5,067,333 A | 11/1991 | Duncan et al. |
| 5,074,520 A | 12/1991 | Lee et al. |
| 5,085,399 A | 2/1992 | Tsutsui et al. |
| 5,085,948 A | 2/1992 | Tsukamoto et al. |
| 5,095,945 A | 3/1992 | Jensen |
| 5,109,347 A | 4/1992 | Quick, Jr. et al. |
| 5,111,969 A | 5/1992 | Knepler |
| 5,125,433 A | 6/1992 | DeMoss et al. |
| 5,139,044 A | 8/1992 | Otten et al. |
| 5,148,824 A | 9/1992 | Wilson et al. |
| 5,170,361 A | 12/1992 | Reed |
| 5,170,514 A | 12/1992 | Weigert |
| 5,171,429 A | 12/1992 | Yasuo |
| 5,174,495 A | 12/1992 | Eichholz et al. |
| 5,184,642 A | 2/1993 | Powell |
| 5,197,508 A | 3/1993 | Gottling et al. |
| 5,199,790 A | 4/1993 | Pawelzik et al. |
| 5,206,963 A | 5/1993 | Wiens |
| 5,215,251 A | 6/1993 | Volk, Jr. et al. |
| 5,224,509 A | 7/1993 | Tanaka et al. |
| 5,240,028 A | 8/1993 | Hoch, Jr. et al. |
| 5,255,844 A | 10/1993 | Miller et al. |
| 5,261,597 A | 11/1993 | Perlman et al. |
| 5,273,208 A | 12/1993 | Herrick |
| 5,287,570 A | 2/1994 | Peterson et al. |
| 5,294,045 A | 3/1994 | Harris |
| 5,294,051 A | 3/1994 | Piegari |
| 5,295,274 A | 3/1994 | Daniels et al. |
| 5,299,775 A | 4/1994 | Kolze |
| 5,303,731 A | 4/1994 | Vavra et al. |
| 5,322,086 A | 6/1994 | Sullivan |
| 5,329,949 A | 7/1994 | Moncourtois et al. |
| 5,339,859 A | 8/1994 | Bowman |
| 5,348,223 A | 9/1994 | Sonesson et al. |
| 5,350,112 A | 9/1994 | Stein |
| 5,358,177 A | 10/1994 | Cashmore |
| 5,358,213 A | 10/1994 | Pilolla |
| 5,361,215 A | 11/1994 | Tompkins et al. |
| 5,400,961 A | 3/1995 | Tsutsui et al. |
| 5,411,241 A | 5/1995 | Nilsson et al. |
| 5,417,404 A | 5/1995 | Varden |
| 5,428,850 A | 7/1995 | Hiraishi et al. |
| RE35,018 E | 8/1995 | Homan |
| 5,452,740 A | 9/1995 | Bowman |
| 5,459,890 A | 10/1995 | Jarocki |
| 5,462,224 A | 10/1995 | Enoki et al. |
| 5,494,077 A | 2/1996 | Enoki et al. |
| 5,504,950 A | 4/1996 | Natalizia et al. |
| 5,506,391 A | 4/1996 | Burayez et al. |
| 5,511,723 A | 4/1996 | Eki et al. |
| 5,518,311 A | 5/1996 | Althaus et al. |
| 5,550,753 A | 8/1996 | Tompkins et al. |
| 5,551,630 A | 9/1996 | Enoki et al. |
| 5,564,462 A | 10/1996 | Storch |
| 5,577,660 A | 11/1996 | Hansen |
| 5,588,636 A | 12/1996 | Eichholz et al. |
| 5,598,973 A | 2/1997 | Weston |
| 5,694,653 A | 12/1997 | Harald |
| 5,755,262 A | 5/1998 | Pilolla |
| 5,779,139 A | 7/1998 | Ueno |
| 5,810,474 A | 9/1998 | Hidalgo |

| | | | | | | |
|---|---|---|---|---|---|---|
| 5,829,072 | A | 11/1998 | Hirsch et al. | 6,463,999 B1 | 10/2002 | Jung |
| 5,845,844 | A | 12/1998 | Zosimodis | 6,464,210 B1 | 10/2002 | Teran et al. |
| 5,855,356 | A | 1/1999 | Fait | 6,473,917 B1 | 11/2002 | Mateina |
| 5,860,596 | A | 1/1999 | Kolt | 6,478,285 B1 | 11/2002 | Bergmann |
| 5,873,518 | A | 2/1999 | Richmond et al. | 6,481,029 B1 | 11/2002 | Mateina |
| 5,889,684 | A | 3/1999 | Ben-David et al. | 6,481,634 B1 | 11/2002 | Zosimadis |
| 5,904,292 | A | 5/1999 | McIntosh | 6,497,372 B2 | 12/2002 | Lee et al. |
| 5,927,332 | A | 7/1999 | Richard | 6,513,787 B1 | 2/2003 | Jeromson et al. |
| 5,931,374 | A | 8/1999 | Knapp | 6,517,006 B1 | 2/2003 | Knapp |
| 5,941,635 | A | 8/1999 | Stewart | 6,543,478 B2 | 4/2003 | Kline |
| 5,966,753 | A | 10/1999 | Gauthier et al. | 6,549,816 B2 | 4/2003 | Gauthier et al. |
| 5,970,528 | A | 10/1999 | Shirai et al. | 6,554,196 B2 | 4/2003 | Sasayama et al. |
| 5,975,124 | A | 11/1999 | Stevens, II | 6,557,785 B1 | 5/2003 | Knapp |
| 5,979,775 | A | 11/1999 | Raya | 6,601,986 B2 | 8/2003 | Jang et al. |
| 5,979,776 | A | 11/1999 | Williams | 6,619,320 B2 | 9/2003 | Parsons |
| 6,003,182 | A | 12/1999 | Song | 6,629,645 B2 | 10/2003 | Mountford et al. |
| 6,024,290 | A | 2/2000 | Dosani et al. | 6,637,668 B2 | 10/2003 | Eveleigh |
| 6,029,094 | A | 2/2000 | Diffutt | 6,641,727 B1 | 11/2003 | Aldred et al. |
| 6,044,857 | A | 4/2000 | Stege | 6,655,829 B1 | 12/2003 | Vanden Bussche et al. |
| 6,050,296 | A | 4/2000 | Hoffmann et al. | 6,659,361 B2 | 12/2003 | Sasayama et al. |
| 6,059,192 | A | 5/2000 | Zosimadis | 6,669,843 B2 | 12/2003 | Arnaud |
| 6,079,625 | A | 6/2000 | Lebkuchner | 6,676,024 B1 | 1/2004 | McNerney et al. |
| 6,097,993 | A | 8/2000 | Skupin et al. | 6,679,476 B2 | 1/2004 | Noyes et al. |
| 6,123,094 | A | 9/2000 | Breda | 6,691,338 B2 | 2/2004 | Zieger |
| 6,132,085 | A | 10/2000 | Bergeron | 6,701,194 B2 | 3/2004 | Gauthier et al. |
| 6,168,949 | B1 | 1/2001 | Rubenberger | 6,705,534 B1 | 3/2004 | Mueller |
| 6,195,588 | B1 | 2/2001 | Gauthier et al. | 6,708,895 B1 | 3/2004 | Knapp |
| 6,199,587 | B1 | 3/2001 | Shlomi et al. | 6,713,036 B1 | 3/2004 | Vanden Bussche et al. |
| 6,219,859 | B1 | 4/2001 | Derakhshan | 6,715,731 B1 | 4/2004 | Post et al. |
| 6,234,670 | B1 | 5/2001 | Bergeron | 6,722,575 B1 | 4/2004 | Gagne et al. |
| 6,237,853 | B1 | 5/2001 | Bergmann | 6,769,252 B2 | 8/2004 | Smith |
| 6,239,708 | B1 | 5/2001 | Young | 6,776,395 B1 | 8/2004 | Meier |
| 6,241,379 | B1 | 6/2001 | Larsen | 6,805,330 B2 | 10/2004 | Bush |
| 6,250,558 | B1 | 6/2001 | Dogre Cuevas | 6,811,713 B2 | 11/2004 | Arnaud |
| 6,250,601 | B1 | 6/2001 | Kolar et al. | 6,820,816 B1 | 11/2004 | Reid |
| 6,253,624 | B1 | 7/2001 | Broden et al. | 6,823,892 B1 | 11/2004 | Knapp |
| 6,264,121 | B1 | 7/2001 | McClary | 6,826,455 B1 | 11/2004 | Iott et al. |
| 6,270,014 | B1 | 8/2001 | Bollas et al. | 6,854,658 B1 | 2/2005 | Houghton et al. |
| 6,273,394 | B1 | 8/2001 | Vincent et al. | 7,175,099 B2 | 2/2007 | Bilyard et al. |
| 6,279,777 | B1 | 8/2001 | Goodin | 2001/0020645 A1 | 9/2001 | Mountford et al. |
| 6,286,464 | B1 | 9/2001 | Abraham et al. | 2001/0044954 A1 | 11/2001 | DiCarlo |
| 6,286,764 | B1 | 9/2001 | Garvey et al. | 2002/0020179 A1 | 2/2002 | Winkler |
| 6,290,139 | B1 | 9/2001 | Kolze | 2002/0029416 A1 | 3/2002 | Shaw et al. |
| 6,294,786 | B1 | 9/2001 | Marcichow et al. | 2002/0148040 A1 | 10/2002 | Mateina |
| 6,305,610 | B1 | 10/2001 | Estes | 2002/0179723 A1 | 12/2002 | Wack et al. |
| 6,305,663 | B1 | 10/2001 | Miller | 2003/0052007 A1 | 3/2003 | Paul et al. |
| 6,315,208 | B1 | 11/2001 | Doyle | 2003/0075611 A1 | 4/2003 | Eveleigh |
| 6,317,717 | B1 | 11/2001 | Lindsey et al. | 2003/0080194 A1 | 5/2003 | O'Hara et al. |
| 6,321,785 | B1 | 11/2001 | Bergmann | 2003/0088338 A1 | 5/2003 | Phillips et al. |
| 6,336,233 | B1 | 1/2002 | Shaw et al. | 2003/0125842 A1 | 7/2003 | Chang et al. |
| 6,340,032 | B1 | 1/2002 | Zosimadis | 2003/0126993 A1 | 7/2003 | Lassota et al. |
| 6,352,106 | B1 | 3/2002 | Hartman | 2003/0218074 A1 | 11/2003 | Beck et al. |
| 6,363,549 | B2 | 4/2002 | Humpert | 2004/0000594 A1 | 1/2004 | Beck et al. |
| 6,378,545 | B1 | 4/2002 | Bozkan et al. | 2004/0041033 A1 | 3/2004 | Kemp |
| 6,382,252 | B1 | 5/2002 | Moore et al. | 2004/0041034 A1 | 3/2004 | Kemp |
| 6,390,125 | B2 | 5/2002 | Pawelzik et al. | 2004/0134545 A1 | 7/2004 | Ford |
| 6,394,361 | B1 | 5/2002 | Fridmann et al. | 2004/0193326 A1 | 9/2004 | Phillips et al. |
| 6,405,932 | B1 | 6/2002 | Palmer | 2007/0057215 A1 | 3/2007 | Parsons et al. |
| 6,408,881 | B2 | 6/2002 | Lorenzelli et al. | | | |
| 6,435,213 | B2 | 8/2002 | Lou | | | |

FOREIGN PATENT DOCUMENTS

| | | | |
|---|---|---|---|
| 6,438,770 B1 | 8/2002 | Hed et al. | |
| 6,445,880 B1 | 9/2002 | Hollander et al. | JP 03235103 A * 10/1991 |
| 6,446,875 B1 | 9/2002 | Brooks et al. | JP 08311967 A * 11/1996 |
| RE37,888 E | 10/2002 | Cretu-Petra | |
| 6,460,735 B1 | 10/2002 | Greenwald et al. | * cited by examiner |

ELECTRONIC PROPORTIONING VALVE

BACKGROUND AND SUMMARY OF THE INVENTION

The present invention relates to a water deliver system and, more particularly, to an electronic proportioning valve configured to mix hot water and cold water to form a mixed water having a desired temperature and flow rate.

Systems for mixing hot water and cold water in a manner providing for a mixed water of a desired temperature are well known in the art. For example, it is known to provide an electronically controlled proportioning valve for mixing hot water and cold water to provide a mixed water of a desired temperature. Typically, such a system includes a controller operating in a feedback manner such that a temperature measured by a sensor in the outlet of the system is compared to a desired mixed water temperature. The opening and closing of the hot water valve and the cold water valve are controlled based upon the difference between the measured temperature and the desired temperature of the mixed water.

Such known proportioning valves typically exhibit a slow response time. More particularly, there may be a significant delay between the sensor measuring the mixed water temperature and the mixed water temperature being changed in response thereto. As such, large temperature spikes in the mixed water may form as a result of variations of input hot and cold water temperature and pressure. Additionally, traditional proportioning valves operating in a feedback manner typically cause oscillation of the hot and cold water valve positions as the system "hunts" for the desired temperature.

According to an illustrative embodiment of the present invention, a water delivery system is provided for connection to a cold water source, a hot water source, and a mixed water outlet. The water delivery system is configured to provide a mixed water of a desired water temperature to the mixed water outlet. The water delivery system includes a cold water valve adapted to be coupled to the cold water source for receiving cold water and having a cold water outlet. A hot water valve is adapted to be coupled to the hot water source for receiving hot water and has a hot water outlet. A mixing chamber or fluid mixer is configured to receive cold water from the cold water outlet, to receive hot water from the hot water outlet, and to provide a mixed water to the mixed water outlet. A controller is operably coupled to the cold water valve and the hot water valve. The controller is configured to adjust the cold water valve and the hot water valve to regulate a mixed water temperature of the mixed water to substantially correspond to the desired water temperature. The controller is further configured to regulate the mixed water temperature based on at least one characteristic of the cold water, at least one characteristic of the hot water, and at least one characteristic of the mixed water. The controller operates alternatively in a feed forward manner and a feedback manner. The feed forward manner provides for the adjustment of the cold water valve and the hot water valve based on the at least one characteristic of the hot water and the at least one characteristic of the cold water. The feedback manner provides for the adjustment of the cold water valve and the hot water valve based on the at least one characteristic of the mixed water. The controller operates in the feed forward manner when at least one of the cold water source and the hot water source is unstable.

According to a further illustrative embodiment of the present invention, a method is provided for controlling a water delivery system to provide a mixed water to a mixed water outlet. The water delivery system includes a cold water valve connected to a cold water source, a hot water source connected to a hot water source, and a mixer for combining cold water from the cold water valve and hot water from the hot water valve, the mixer being connected to the mixed water outlet. The method includes the steps of receiving an input representing a desired temperature of the mixed water being provided to the mixed water outlet, and monitoring at least one characteristic of the cold water provided to the cold water valve, at least one characteristic of the hot water provided to the hot water valve, and at least one characteristic of the mixed water provided to the mixed water outlet. The method further comprises the steps of controlling the cold water valve and the hot water valve in a feed forward manner if at least one of the cold water and the hot water is unstable. The method further comprises the step of controlling the cold water valve and the hot water valve in a feedback manner only if both the cold water source and the hot water source are stable.

In yet another illustrative embodiment of the present invention, a proportioning valve system is provided for connection to a cold water source, a hot water source, and a mixed water outlet. The proportioning valve system is configured to deliver a mixed water of a desired temperature to the mixed water outlet. The proportioning valve system includes a cold water valve configured to be in fluid communication with a cold water source for receiving cold water. A cold water temperature sensor is configured to measure the temperature of the cold water supplied to the cold water valve from the cold water source and to provide a cold water temperature signal indicative thereof. A cold water pressure sensor is configured to measure the pressure of the cold water supplied to the cold water valve from the cold water source and provide a cold water pressure signal indicative thereof. A hot water valve is configured to be in fluid communication with the hot water source for receiving hot water. A hot water temperature sensor is configured to measure the temperature of the hot water supplied to the hot water valve from the hot water source and to provide a hot water temperature signal indicative thereof. A hot water pressure sensor is configured to measure the pressure of the hot water supplied to the hot water valve from the hot water source and provide a hot water pressure signal indicative thereof. A user input device is configured to receive the desired temperature from the user and to provide a set temperature signal indicative of the desired temperature. A controller is in communication with the cold water temperature sensor, the cold water pressure sensor, the hot water temperature sensor, the hot water pressure sensor, and the user input device. The controller is configured to regulate the mixed water temperature of the mixed water to substantially correspond to the desired water temperature by adjusting in a feed forward manner the cold water valve and the hot water valve in response to the cold water temperature signal, the cold water pressure signal, the hot water temperature signal, the hot water pressure signal, and the set temperature signal.

According to a further illustrative embodiment of the present invention, a proportioning valve system is provided for connection to a cold water source, a hot water source, and a mixed water outlet. The proportioning valve system is configured to deliver a mixed water of the desired temperature to the mixed water outlet. The proportioning valve system includes a cold water valve configured to be in fluid communication with the cold water source for receiving cold water. A cold water servo motor is coupled to the cold water valve and is configured to control the position of the cold water valve. A cold water temperature sensor is configured to measure the temperature of the cold water supplied to the cold water valve from the cold water source and to provide a cold water temperature signal indicative thereof. A hot water valve is configured to be in fluid communication with the hot water source. A hot water servo motor is coupled to the hot water valve and is configured to control the position of the hot water valve. A hot water temperature sensor is configured to measure the temperature of the hot water supplied to the hot water valve from the hot water source and to provide a hot water temperature signal indicative thereof. A user input device is configured to receive a desired temperature from the user and to provide a set temperature signal indicative of the desired temperature. A controller is in communication with the cold water temperature sensor, the hot water temperature sensor, and the user input device. The controller is configured to generate a cold water pulse width modulated control signal to control the cold water servo motor for positioning the cold water valve in response to the cold water temperature signal, the hot water temperature signal, and the set temperature signal. The controller is further configured to generate a hot water pulse width modulated control signal to control the hot water servo motor for positioning the hot water valve in response to the hot water temperature signal, the cold water temperature signal, and the set temperature signal.

According to yet another illustrative embodiment of the present invention, a water delivery system includes a valve configured to be coupled to a water source for receiving water, and defining a valve restriction. An actuator is operably coupled to the valve and is configured to control the position of the valve. An outlet is coupled to the valve, and a fluid delivery device is coupled to the outlet and defines an outlet restriction. An inlet pressure sensor is configured to measure pressure of the water provided to the valve. An outlet pressure sensor is configured to measure pressure of the water supplied to the outlet. A controller is configured to control the actuator for adjusting the valve in response to the inlet pressure and the outlet pressure, such that the valve restriction is substantially equal to the outlet restriction.

According to a further illustrative embodiment of the present invention, a water delivery system is provided for connection to a cold water source, a hot water source, and a mixed water outlet. The water delivery system is configured to provide a mixed water of a desired temperature to the mixed water outlet. The water delivery system includes a cold water valve adapted to be coupled to the cold water source and having a cold water outlet. A hot water valve is adapted to be coupled to the hot water source and includes a hot water outlet. A fluid mixer is configured to receive cold water from the cold water outlet, and to receive hot water from the hot water outlet. The fluid mixer includes a mixing element configured to separate the cold water into a plurality of spaced apart cold water streams and to separate the hot water into a plurality of spaced apart hot water streams. The fluid mixer is further configured to mix individual ones of the cold water streams and the hot water streams into a plurality of spaced apart mixed water streams. The fluid mixer is further configured to combine the plurality of mixed water streams into a combined mixed water provided to the water outlet. A controller is operably coupled to the cold water valve and the hot water valve, and is configured to adjust the cold water valve and the hot water valve to regulate a mixed water temperature of the mixed water to substantially correspond to the desired water temperature.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
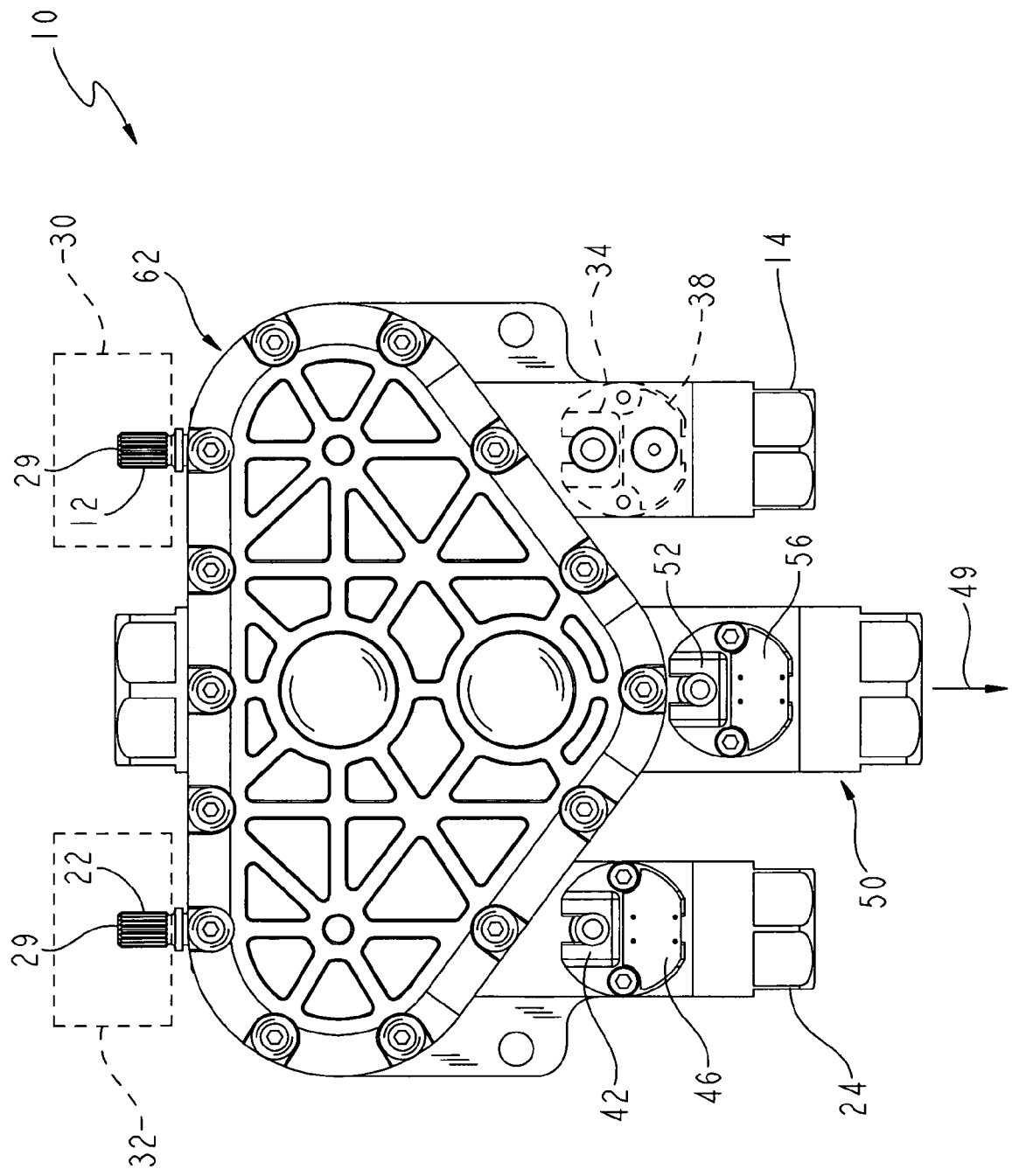
FIG. 1 is a front elevational view of an illustrative embodiment fluid delivery system according to the present invention, with the servo motors shown in phantom.
Figure 2:
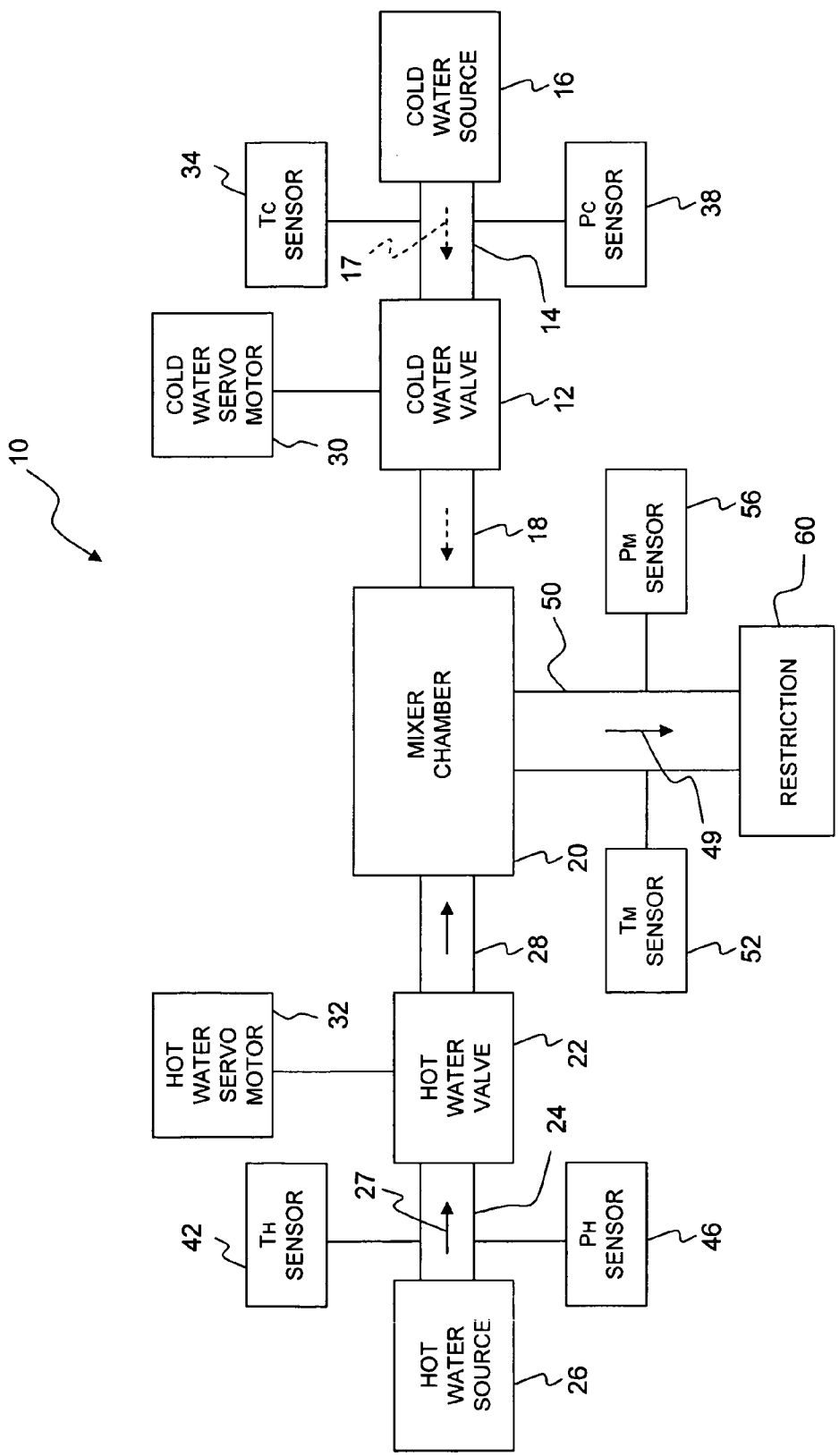
FIG. 2 is a block diagram of the fluid delivery system of FIG. 1.

Referring initially to FIGS. 1 and 2, the water delivery system or proportioning valve system 10 of the illustrative embodiment includes a cold water valve 12 having an inlet 14 configured to be coupled to a cold water source 16 for receiving cold water 17 (FIG. 2). An outlet 18 of the cold water valve 12 is in fluid communication with a fluid mixer 20. Similarly, a hot water valve 22 has an inlet 24 configured to be coupled to a hot water source 26 for receiving hot water 27 (FIG. 2). An outlet 28 of the hot water valve 22 is in fluid communication with the fluid mixer 20.

Both the cold water valve 12 and the hot water valve 22 may be of conventional design and illustratively include a rotatable valving member 29 (FIGS. 1 and 4), wherein rotation of the valving member increases or decreases the rate of water flow through the respective valve 12, 22. Illustratively, the valving members 29 are of a low torque ceramic disc variety that require reduced energy to operate and are field replaceable. In the illustrative embodiment, the cold water valve 12 and the hot water valve 22 comprise Model No. F120 available from Fluehs Corporation of Germany. It should be appreciated that other suitable valves may be readily substituted therefor.

With further reference to the illustrative embodiment of FIGS. 1 and 2, a cold water servo motor 30 is operably coupled to the cold water valve 12, while a hot water servo motor 32 is operably coupled to the hot water valve 22. More particularly, the cold water servo motor 30 and the hot water servo motor 32 are each coupled to the respective rotatable valving members 29 of the cold water valve 12 and the hot water valve 22. As such, operation of the servo motors 30, 32 adjust the flow of cold water 17 through the cold water valve 12 and hot water 27 through the hot water valve 22. Each servo motor 30, 32 may be of conventional design and is configured to receive a control signal 31, 33, respectively, that represents a desired position of the servo shaft. More particularly, each servo motor 30, 32 is configured to respond to a pulse width modulated control signal 31, 33, wherein the duration or width of the control signal pulse determines the position of the shaft (not shown) of the servo motor 30, 32. As known in the art, a predetermined pulse width defines a center position of the servo motor 30, 32 while a longer pulse causes the servo motor 30, 32 to turn in a clockwise from center position, and a shorter pulse causes the servo motor 30, 32 to turn in a counterclockwise from center position. In the illustrative embodiment, the servo motors 30, 32 comprise Model No. HS 5475 HB available from Hitec RCD USA, Inc. of Poway, Calif.

While servo motors 30, 32 are utilized in the illustrative embodiment, it should be appreciated that other suitable actuators may be substituted therefor. For example, in a further illustrative embodiment, a direct current (DC) motor with feedback control may replace each servo motor 30, 32. More particularly, an encoder, such as a Hall-effect device (not shown), or any other device or circuit that produces a wave form in response to motor operation, may be operably coupled to each DC motor. As known in the art, a Hall-effect device changes state based on magnetic field. In the further illustrative embodiment, each DC motor has dual shafts, one extending forwardly and one extending rearwardly. A magnetic disk with alternating poles is placed on the rear shaft and above the Hall-effect device. When the motor turns the shafts, the output of the Hall-effect is a square wave. The position of the motor shafts may be determined by counting wave pulses. As an example, if the motor was attached to a 180 degree valve, a predetermined number of pulses would be generated as the motor shafts rotated from a 0 degree position to a 180 degree position. Assuming for discussion, 360 pulses are generated in such a situation, then for every 2 pulses the output shafts have rotated by 1 degree. As such, if a user desired to rotate the motor shafts by 90 degrees from the 0 degree position, the system would activate the motor and then deactivate the motor when 180 pulses have been detected. If a user wanted to then place the motor shafts in the 45 degree position, the system would activate the motor so that the shafts rotate in an opposite direction, and then deactivate the motor after detecting 90 pulses.

Figure 3:
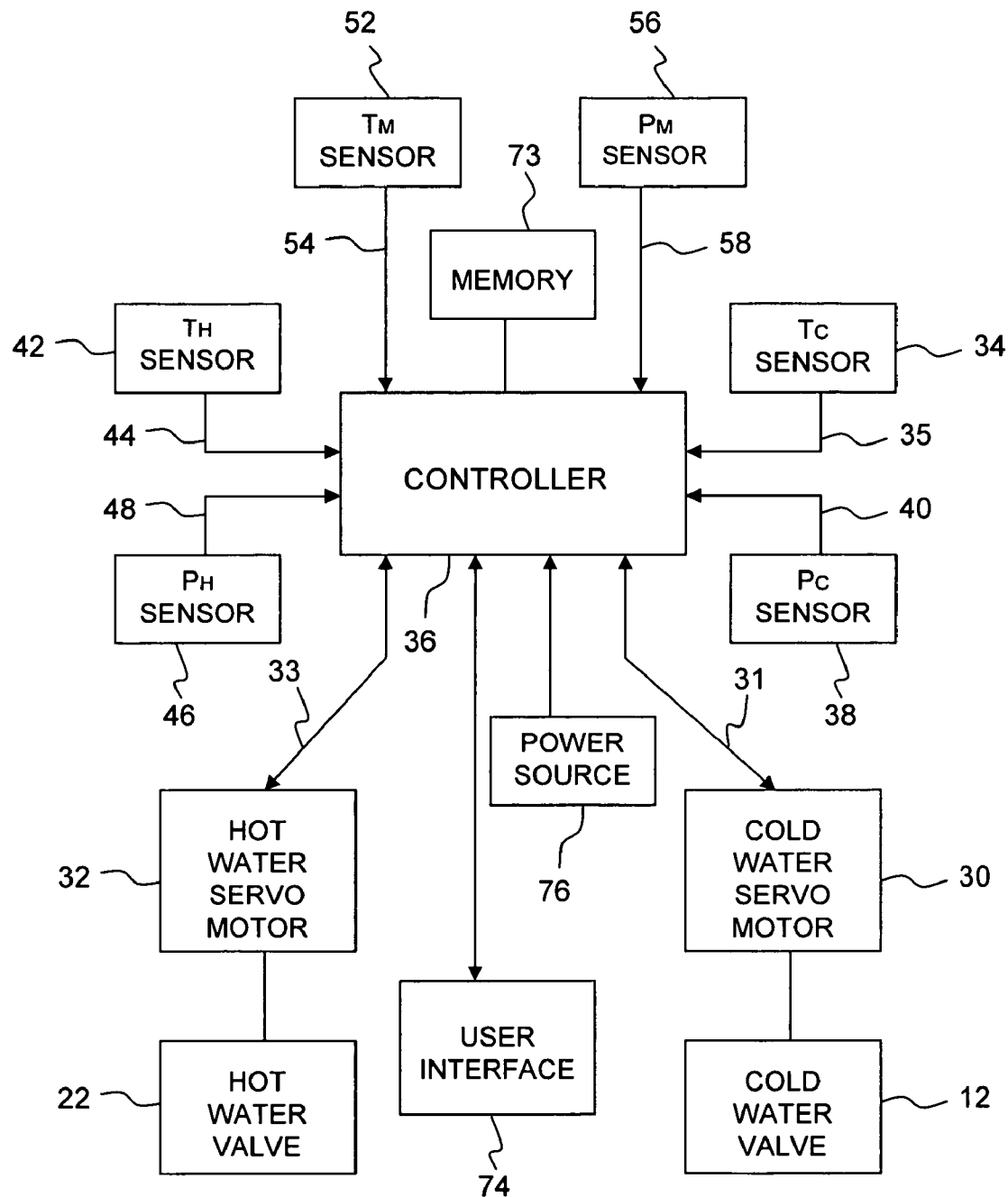
FIG. 3 is a block diagram illustrating communication links between the various control components of the fluid delivery system of FIG. 1.

Referring now to FIGS. 1-3, a cold water temperature sensor 34 is operably coupled to the inlet 14 of the cold water valve 12 and is configured to measure a temperature of the cold water 17 flowing therethrough. The cold water temperature sensor 34 provides a cold water temperature signal 35 indicative thereof to a controller 36 indicative of the measured temperature ($T_C$) of the cold water 17 (FIG. 3). Similarly, a cold water pressure sensor 38 is operably coupled to the inlet 14 of the cold water valve 12 and is configured to measure a pressure ($P_C$) of the cold water 17 therein. The cold water pressure sensor 38 is further configured to send a signal 40 to the controller 36 indicative of the measured cold water pressure ($P_C$).

A hot water temperature sensor 42 is operably coupled to the inlet 24 of the hot water valve 22 and is configured to measure a temperature ($T_H$) of the hot water 27 flowing into the hot water valve 22. The sensor 42 is further configured to send a hot water temperature signal 44 to the controller 36 indicative of the measured temperature ($T_H$) of the hot water 27. A hot water pressure sensor 46 is likewise operably coupled to the inlet 24 of the hot water valve 22 and is configured to measure the pressure ($P_H$) of the hot water 27 contained therein. The hot water pressure sensor 46 sends a signal 48 indicative of the measured hot water pressure ($P_H$) to the controller 36.

As further detailed herein, the fluid mixer 20 receives the cold water 17 from the outlet 18 of the cold water valve 12 and the hot water 27 from the outlet 28 of the hot water valve 22, and then mixes the cold water 17 and the hot water 27 to form a mixed water 49 which is then discharged through a mixed water outlet 50. A mixed water temperature sensor 52 is operably coupled to the mixed water outlet 50 and is configured to measure the temperature ($T_M$) of the mixed water 49 flowing therethrough. The mixed water temperature sensor 52 is configured to send a signal 54 indicative of the measured mixed water temperature ($T_M$) to the controller 36. A mixed water pressure sensor 56 is operably coupled to the mixed water outlet 50 and is configured to measure the pressure ($P_M$) of the mixed water 49 contained therein. The mixed water pressure sensor 56 is configured to send a signal 58 indicative of the mixed water pressure ($P_M$) to the controller 36.

As shown in FIG. 2, a restriction 60 may be coupled to the mixed water outlet 50. Illustratively, this restriction 60 comprises a water delivery device, such as a shower head, spray nozzle, filter, or reducing fitting. As known in the art, this restriction 60 will typically cause resistance to the flow of mixed water 49 through the outlet 50, resulting in a back pressure. Coupling of the restriction 60 to the mixed water outlet 50 is optional and the present invention finds equal applicability in systems with restrictions (e.g., shower heads) and without restrictions (e.g., tub filler).

Figure 4:
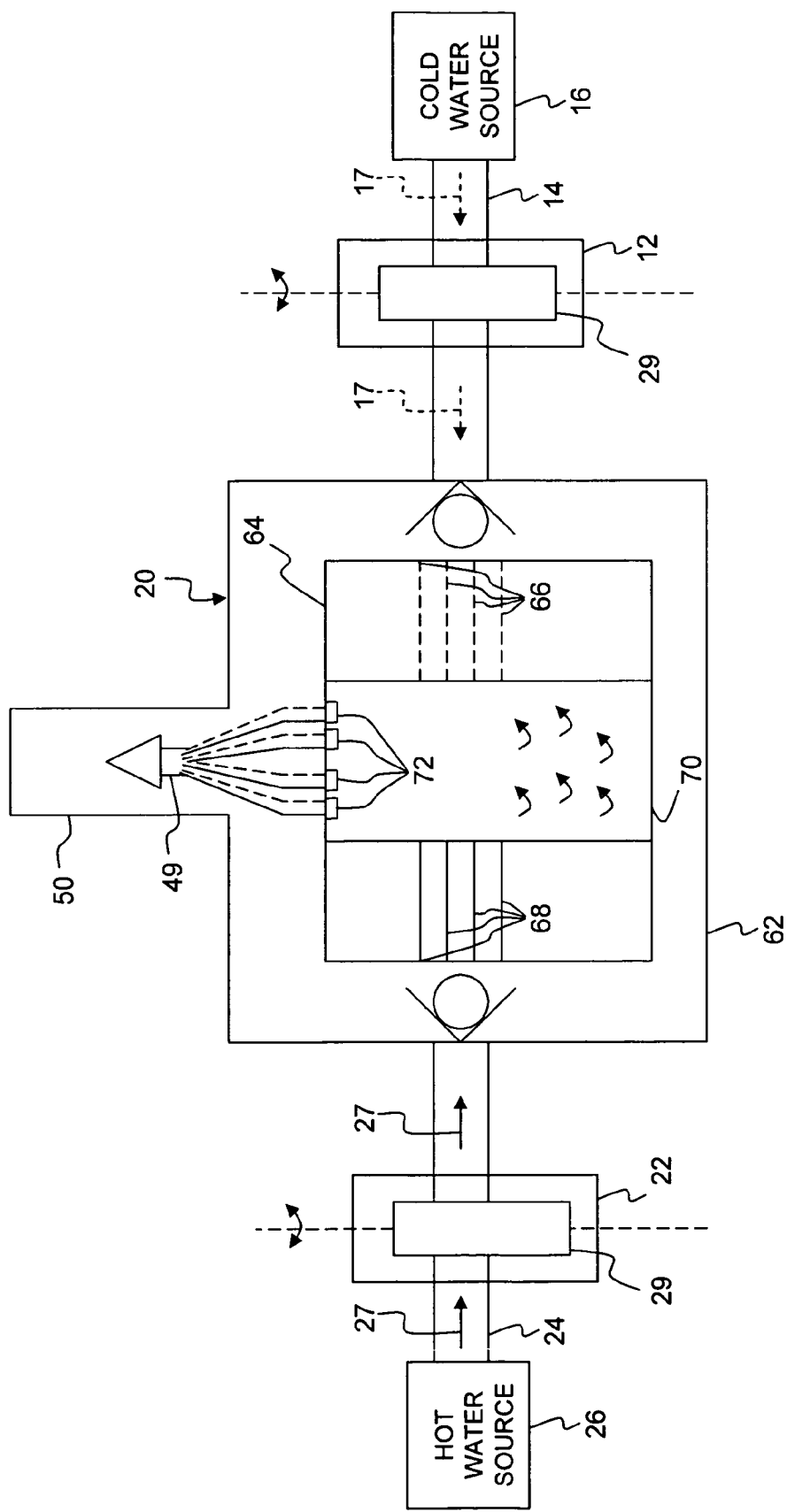
FIG. 4 is a schematic representation of the fluid mixer of the fluid delivery system of FIG. 1.

With further reference to FIG. 4, an illustrative embodiment fluid mixer 20 is schematically illustrated. More particularly, the fluid mixer 20 includes a housing 62 configured to receive the uniform stream of cold water 17 and the uniform stream of hot water 27. The fluid mixer 20 includes a mixing element 64 which separates the cold water 17 into a plurality of spaced apart cold water streams 66 and separates the hot water 27 into a plurality of spaced apart hot water streams 68. Within the mixing element 64, a combination channel 70 turbulently mixes each individual cold water stream 66 with a corresponding hot water stream 68, thereby forming a plurality of spaced apart mixed water streams 72. These mixed water streams 72 are then joined together to form a single combined stream of mixed water 49 which is supplied to the mixed water outlet 50.

Additional details of an illustrative embodiment fluid mixer 20 for use in connection with the proportioning valve system 10 of the present invention are detailed in U.S. patent application Ser. No. 11/109,283, entitled "Fluid Mixer", filed concurrently herewith, which is assigned to the assignee of the present invention and is expressly hereby incorporated by reference.

Figure 5:
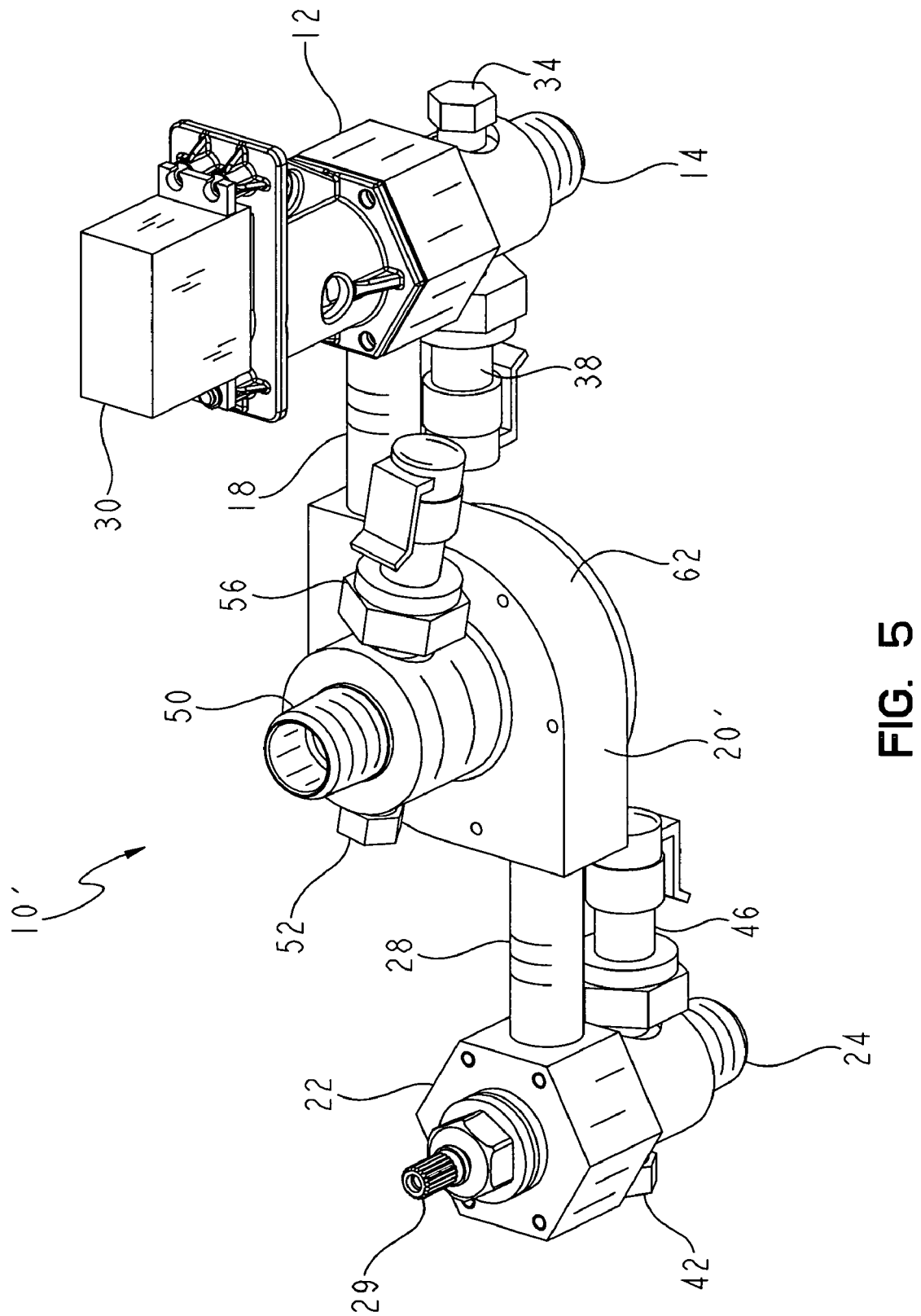
FIG. 5 is a perspective view of a further illustrative embodiment fluid delivery system according to the present invention, with the hot water servo motor removed to reveal the valving member of the hot water valve.

FIG. 5 shows a further illustrative embodiment fluid delivery system 10' of the present invention, where like reference members identify similar components as identified above with respect to the fluid delivery system 10. The fluid mixer 20' cooperates with the outlets 18 and 28 to impart a rotational or swirling flow to water within the housing 62 to facilitate mixing thereof. The mixing chamber 20' may be of the type detailed in U.S. patent application Ser. No. 11/109,282, entitled "Fluid Mixer", filed concurrently herewith, which is assigned to the assignee of the present invention and is expressly hereby incorporated by reference.

Referring further to FIG. 3, the controller 36 for use in connection with the illustrative embodiment proportioning valve system 10 is in communication with the cold water servo motor 30 and the hot water servo motor 32 for controlling operation thereof. The controller 36 is also configured to receive the cold water temperature signal 35 from the cold water temperature sensor 34, and the hot water temperature signal 44 from the hot water temperature sensor 42. Likewise, the controller 36 is configured to receive the mixed water temperature signal 54 from the mixed water temperature sensor 52. The controller 36 is further configured to receive the cold water pressure signal 40 from the cold water pressure sensor 38, and the hot water pressure signal 48 from the hot water pressure sensor 46. Similarly, the controller 36 is configured to receive the mixed water pressure signal 58 from the mixed water pressure sensor 56. A conventional memory 73 is operably coupled to the controller 36. The memory 73 may include, for example, volatile memory (such as RAM) and non-volatile memory (such as ROM, PROM, and EE PROM). The memory 73 may be utilized to provide program instructions to the controller 36 and to store variables during operation of the electronic proportioning valve system 10, as further detailed herein.

A user interface 74 is in communication with the controller 36 and is configured to receive input from a user. More particularly, the user interface 74 receives commands from the user which controls operation of the controller 36. The user interface 74 may comprise any suitable device including a control panel hard-wired to the controller 36 of the type including a display screen and a plurality of user activated buttons. Alternatively, the user interface 74 may communicate with the controller 36 through a wireless interface, such as radio frequency or infrared transmissions. In a further illustrative embodiment, the user interface 74 may include a voice recognition module such that the user may control operation of the controller 36 by providing verbal instructions. Further, the user interface 74 may be located at a variety of locations based upon user preference. For example, the user interface 74 may be positioned on a faucet head, at the side or front of a sink to facilitate access by handicapped users, or at the side or outside of a shower (not shown). A conventional communications bus may be utilized to facilitate communication between the controller 36 and the various components illustrated in FIG. 3

A conventional power source 76 is coupled to the controller 36 and is configured to provide power to the electrical components of the system 10, including the cold water servo motor 30, the hot water servo motor 32, and the user interface 74. The power source 76 may include a backup battery which is rechargeable through a hydrogenerator (not shown). More particularly, the fluid mixer 20 may include a hydrogenerator for generating electrical current in response to water flow through the system 10. The hydrogenerator may perform battery charging and support power needs of the system 10.

Figure 6:
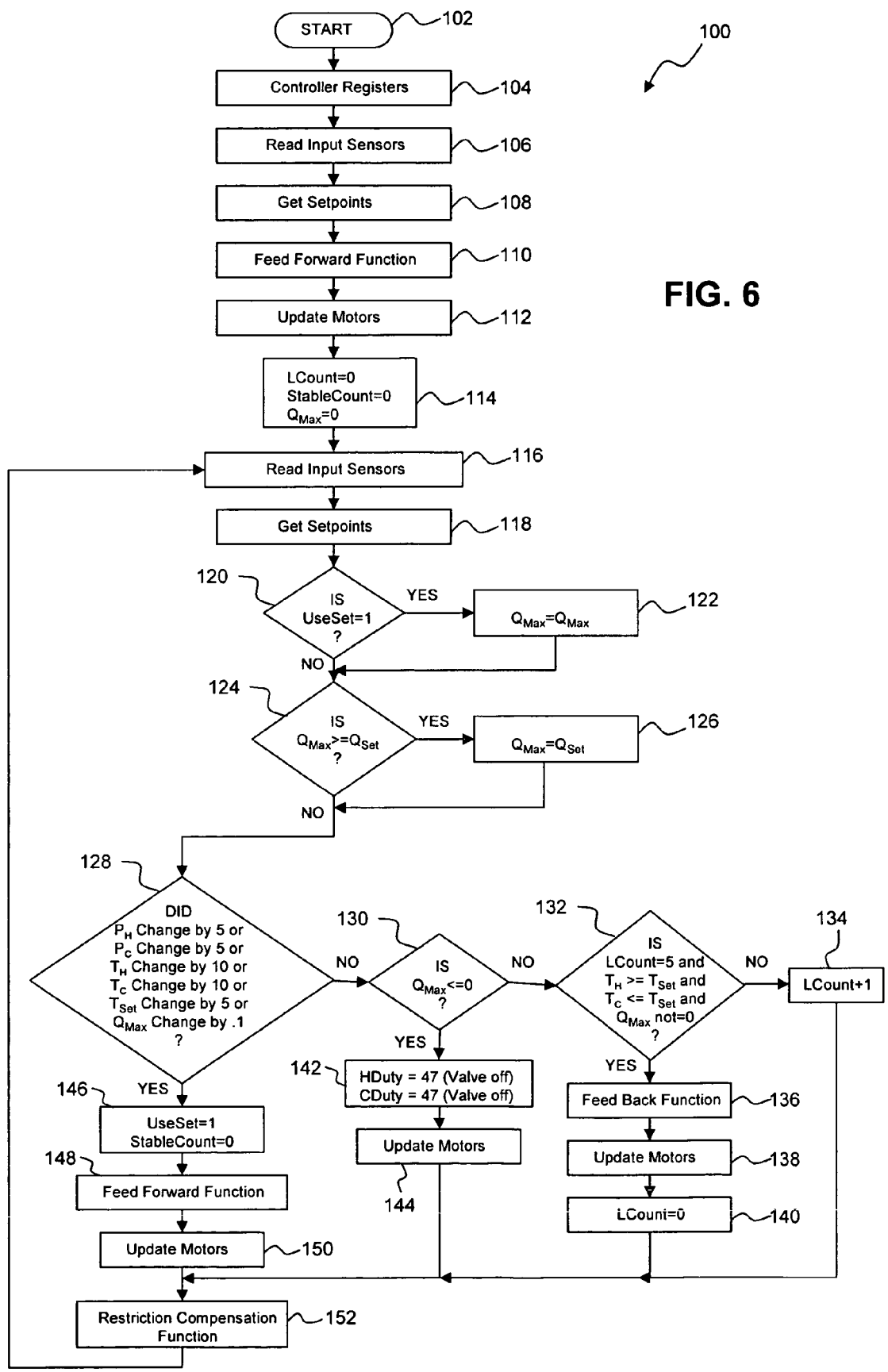
FIG. 6 is a flow chart of an illustrative embodiment method of operation of the fluid delivery system of FIG. 1.
Figure 9:
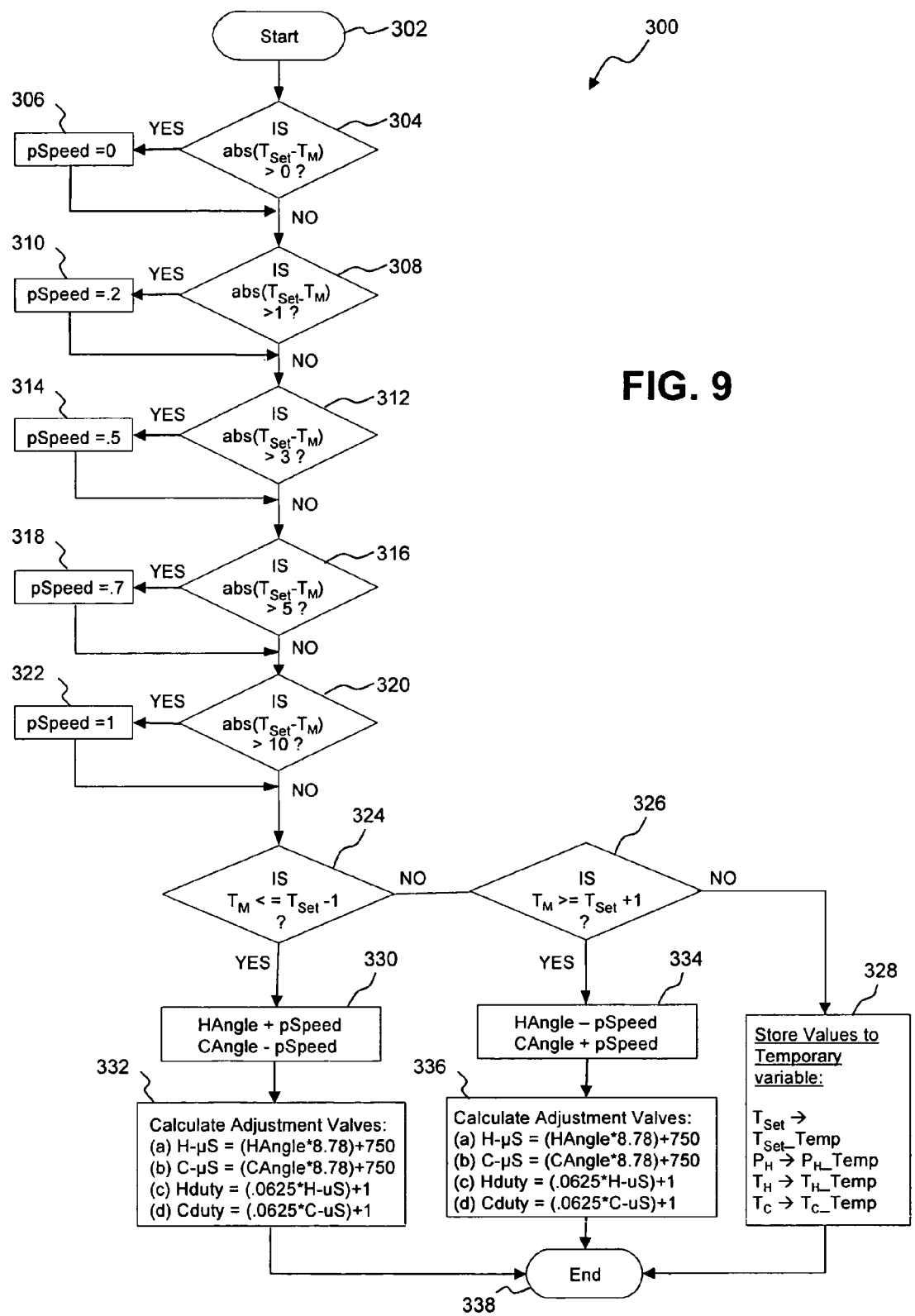
FIG. 9 is a flow chart of an illustrative embodiment feed back method of operation.
Figure 10:
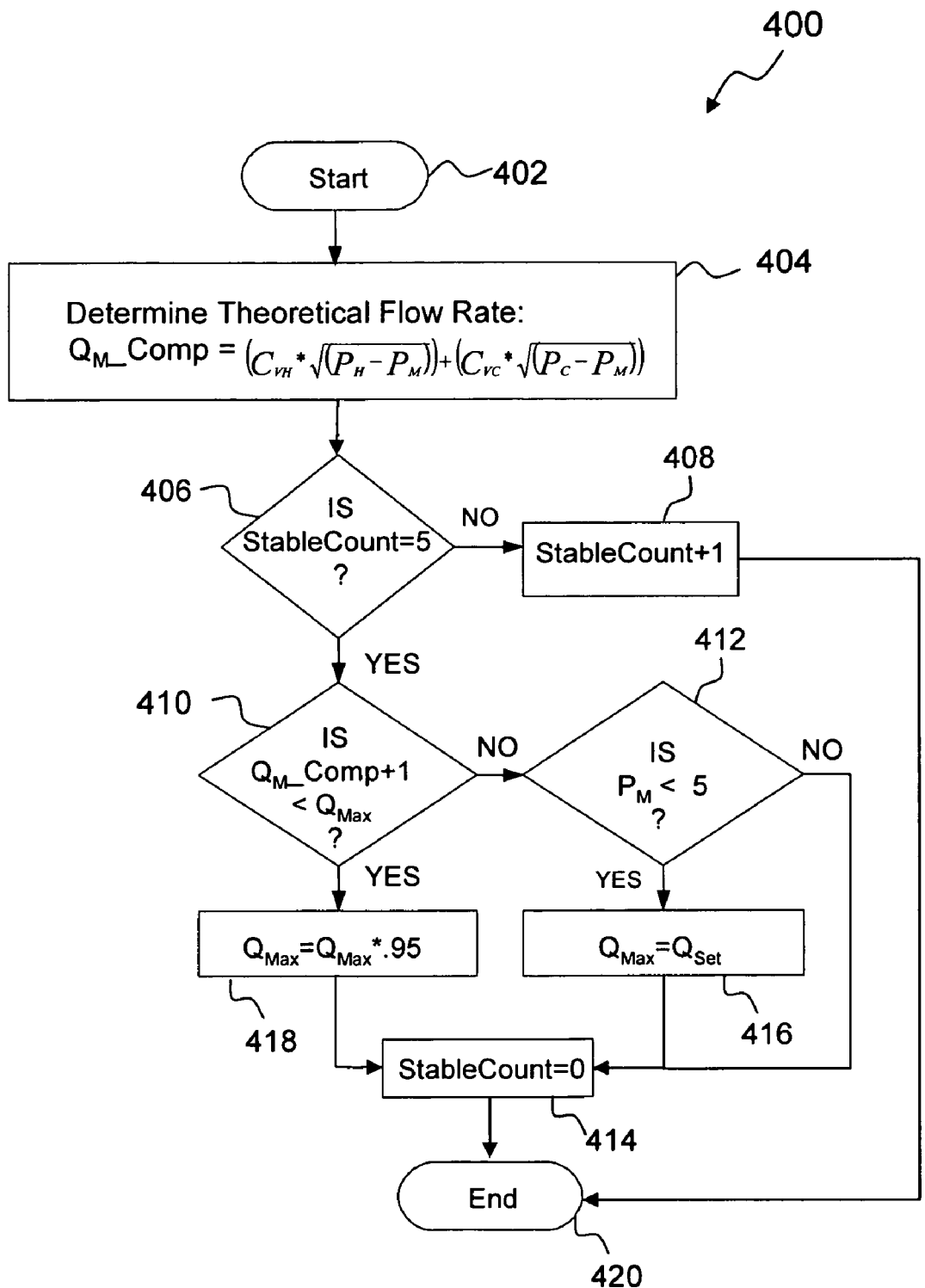
FIG. 10 is a flow chart of an illustrative embodiment restriction compensation method of operation.

Referring now to FIG. 6, an illustrative embodiment method of operation of the proportioning valve system 10 is shown. As detailed herein, the overall method or main program 100 illustratively includes three major functional components or routines, including a feed forward function or routine 200 (FIG. 7), a feed back function or routine 300 (FIG. 9), and a restriction compensation function or routine 400 (FIG. 10). The feed forward function 200 is used to calculate theoretical positions of the cold water valve 12 and the hot water valve 22 if a large change to the system 10 occurs. In particular, any significant change in system inputs will cause the angles of the valves 12 and 22 to be recalculated, thus maintaining the stability of the mixed water temperature ($T_M$). The feed forward function 200 facilitates rapid adjustment of the valves 12 and 22 to obtain mixed water temperature ($T_M$) and flow rate ($Q_M$) within a predetermined range to the desired temperature and flow rate. In order to achieve greater accuracy and precision, the feed back function 300 is invoked.

Referring further to FIG. 6, the method 100 begins at block 102 when a user starts or activates the system 10. More particularly, the user may activate the system through operation of the user interface 74. Upon activation, the method 100 continues to block 104 where the controller 36 registers or initializes all variables. Continuing at block 106, the controller 36 next reads input sensors 34, 38, 42, 46, 52, and 56. More particularly, the controller 36 receives the cold water temperature signal 35 from the cold water sensor 34, the cold water pressure signal 40 from the cold water pressure sensor 38, the hot water temperature signal 44 from the hot water temperature sensor 42, the hot water pressure signal 48 from the hot water pressure sensor 46, the mixed water temperature signal 54 from the mixed water temperature sensor 52, and the mixed water pressure signal 58 from the mixed water pressure sensor 56. These values are then stored in the memory 73 which is in communication with the controller 36. As noted above, in the illustrative embodiment the cold water temperature is stored as the variable $T_C$, the cold water pressure is stored as the variable $P_C$, the hot water temperature is stored as the variable $T_H$, the hot water pressure is stored as the variable $P_H$, the measured mixed water temperature is stored as the variable $T_M$, and the mixed water pressure is stored as the variable $P_M$.

The method 100 then continues to block 108 where the controller 36 reads the set points for temperature and flow. In the illustrative embodiment the set point for temperature is stored in the memory 73 as the variable $T_{Set}$, and the set point for flow is stored in the memory 73 as the variable $Q_{Set}$. Both $T_{Set}$ and $Q_{Set}$ are illustratively entered by the user, at the user interface 74 as the desired mixed water temperature and flow rate, respectively. In other words, the variables $T_{Set}$ and $Q_{Set}$ are initially determined by input at the user interface 74. The variable $Q_{Max}$ is initially defined as the maximum combined flow rate through the cold and hot water valves 12 and 22. Next, at block 110 the controller 36 enters into the feed forward function 200, shown in FIG. 7.

The feed forward function or routine 200 begins at block 202 upon power up by the main program 100. The routine 200 then continues to decision block 204 where the controller 36 queries whether the hot water temperature $T_H$ is greater than or equal to the set water temperature $T_{Set}$, and if the cold water temperature $T_C$ is less than or equal to the set water temperature $T_{Set}$. If this question is answered in the negative, then the process 200 continues to block 206, where it is further queried whether the hot water temperature $T_H$ is less than the set water temperature $T_{Set}$, and if the maximum flow rate $Q_{Max}$ is greater than 0.001. As noted above, at block 108 the value of $Q_{Max}$ is initially set to be equal to the value of $Q_{Set}$. In other words, at decision block 206 the controller 36 is determining whether the user has set a temperature $T_{Set}$ greater than the hot water temperature $T_H$, and has set a flow rate greater than approximately 0. If this is answered in the affirmative, then the controller 36 sets a variable CDuty to a predetermined value, illustratively 750 µs, and sets a variable HDuty to a predetermined value, illustratively 1760 µs.

Figure 7:
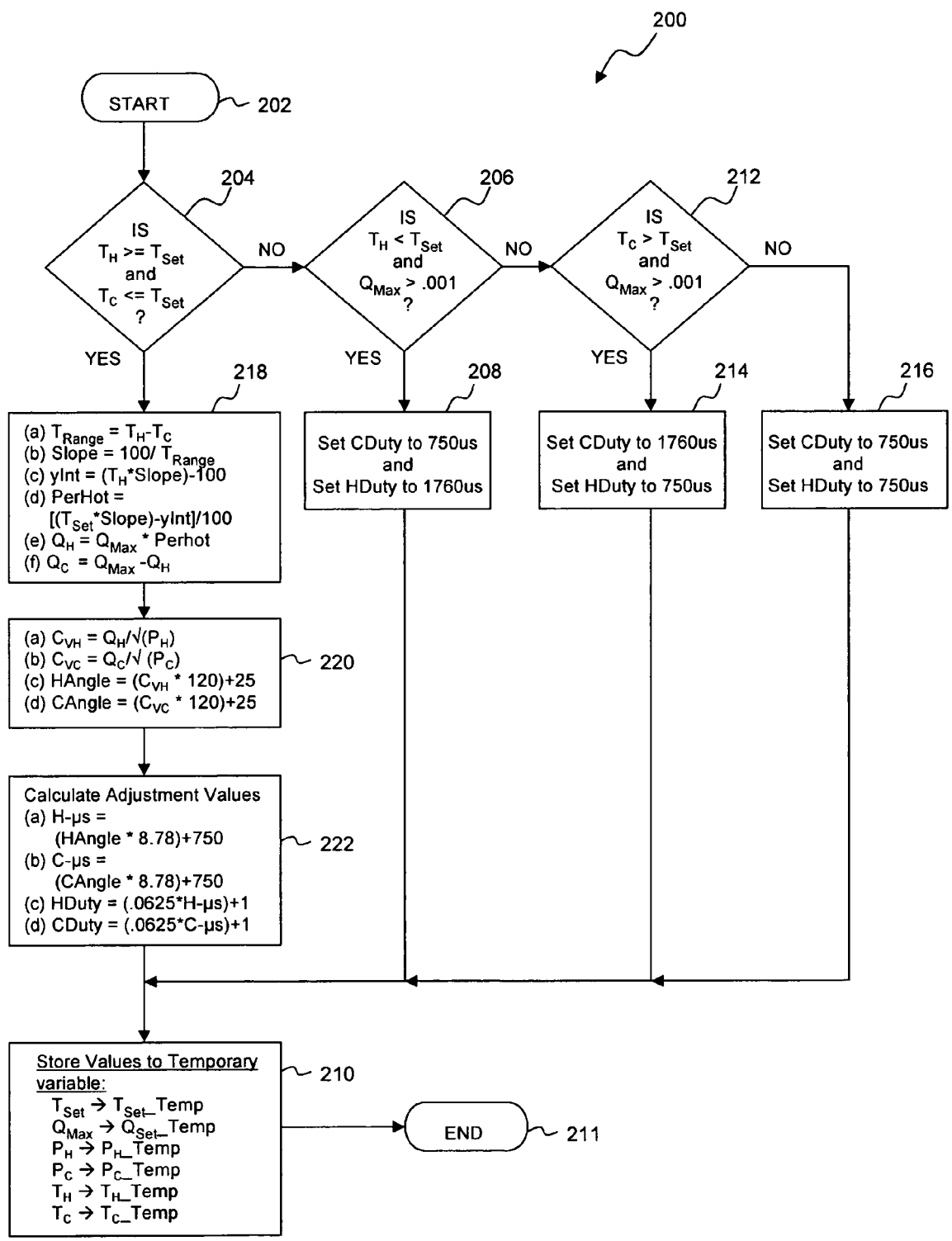
FIG. 7 is a flow chart of an illustrative embodiment feed forward method of operation.

CDuty is the pulse width, or duration, of the pulse width modulated control signal 31 supplied to the cold water servo motor 30. Likewise the variable HDuty is the pulse width, or duration, of the pulse width modulated control signal 33 supplied to the hot water servo motor 32. For the servo motors 30, 32 utilized in the illustrated embodiment, a pulse width of 750 µs closes the respective valve 12, 22, while a pulse width of 1760 µs opens the respective valve 12, 22. It should be appreciated that the values for CDuty and HDuty may vary depending upon the particular actuators 30, 32 utilized. As such, at block 208, the controller 36 sets valves for the control signal 31 which will cause the cold water servo motor 30 to close the cold water valve 12, and sets values for the control signal 33 which will cause the hot water servo motor 32 to open the hot water valve 22. In other words, since the user has requested a flow of mixed water 49 having a temperature exceeding that available from the hot water source 26, the system 10 responds by opening the hot water valve 22 and closing the cold water valve 12. The process then continues to block 210 where the values for $T_{Set}$, $Q_{Max}$, $P_H$, $P_C$, $T_H$, and $T_C$ are stored to temporary variables $T_{Set}$_Temp, $Q_{Set}$_Temp, $P_H$_Temp, $P_C$_Temp, $T_H$_Temp, and $T_C$_Temp, respectively, as shown in FIG. 7. As detailed herein, these temporary variables are stored in memory 73 for later comparative use.

If the query in decision block 206 is answered in the negative, then the process continues to decision block 212 where the controller 36 determines whether the cold water temperature $T_C$ is greater than the set water temperature $T_{Set}$, and whether the maximum flow rate $Q_{Max}$ is greater than approximately 0. If this is answered in the affirmative, the process continues to block 214, where CDuty is set to a predetermined value, illustratively 1760 μs, and HDuty is set to a predetermined value, illustratively 750 μs. In other words, the values of CDuty and HDuty are set in order to instruct the cold water servo motor 30 to open the cold water valve 12 and to instruct the hot water servo motor 32 to close the hot water valve 22. Moreover, since the user has requested a flow of mixed water 49 having a temperature below that available from the cold water source 16, the system 10 responds by setting values for control signals 31 and 33 which will cause the opening of the cold water valve 12 and the closing of the hot water valve 22. After block 214, the process continues at block 210.

If the query at decision block 212 is answered in the negative, then the process continues to block 216 where both CDuty and HDuty are set to a predetermined value, illustratively 750 μs. In other words, if the query in decision block 212 is answered in the negative, then the flow rate $Q_{Max}$ is substantially equal to 0. As such, the values of CDuty and HDuty are set in a manner to provide for movement of the cold water servo motor 30 and hot water servo motor 32 to close the cold water valve 12 and hot water valve 22 respectively. The process then continues to block 210.

Figure 8:
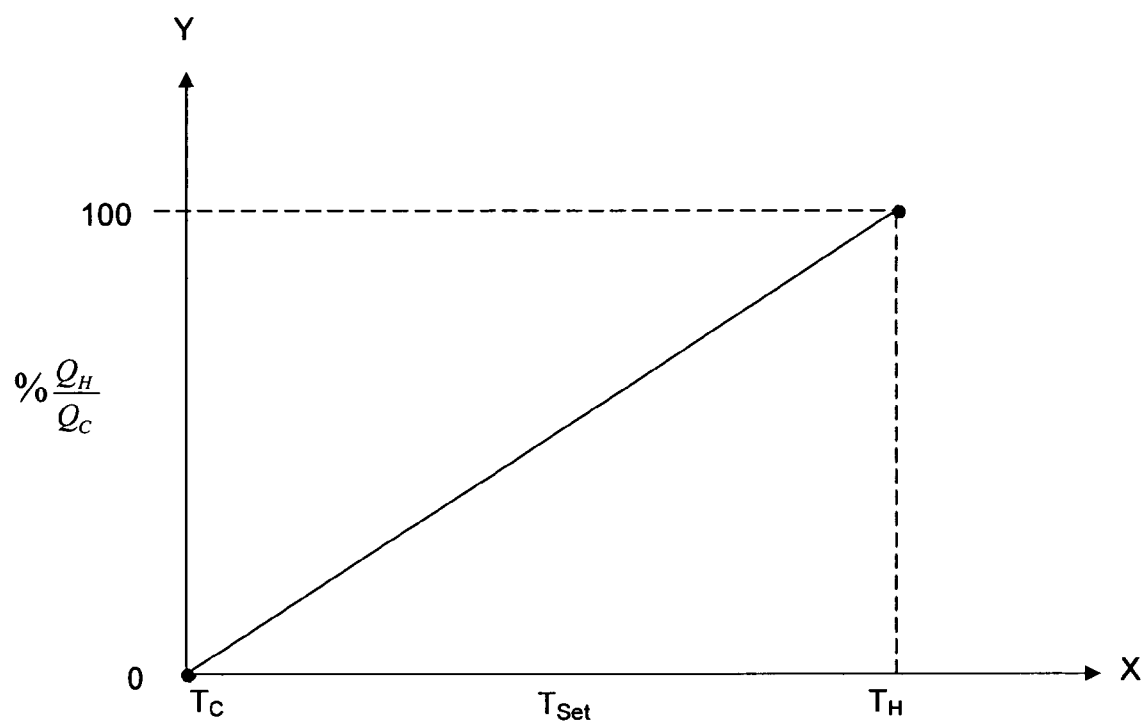
FIG. 8 is a graph illustrating the relationship between desired or set water temperature and the proportion of hot water to cold water in the mixed water.

Returning to decision block 204, should the hot water temperature $T_H$ be greater than or equal to the set water temperature $T_{Set}$, and the cold water temperature $T_C$ be less than or equal to the set water temperature $T_{Set}$, then the process continues to block 218. At block 218, a series of calculations are performed by the controller 36 based upon conservation of energy principles. Initially, using equation (a) of block 218, the temperature $T_{Range}$ is calculated as the difference between the hot water temperature $T_H$ and the cold water temperature $T_C$. The controller 36 then plots $T_{Range}$ as a line on a graph having its x-axis defined as the set temperature $T_{Set}$, and its y-axis defined as the ratio of hot water 27 to cold water 17 in the mixed water 49. An illustrative example of such a graph is shown in FIG. 8. The slope of the line shown in FIG. 8 is then calculated according to equation (b) of block 218, wherein the slope is equal to 100 divided by $T_{Range}$. According to the conventional line equation y=mx+b, the y intercept, yInt, is calculated next. Using equation (c) of block 218, the variable yInt is equal to $(T_H*Slope)-100$. Next, the percentage of hot water PerHot is calculated according to the equation $[(TSet*Slope)-yInt]/100$, as shown in equation (d) of block 218. The theoretical flow rate $Q_H$ for the hot water valve is then calculated according to equation (e) of block 218. This is accomplished by multiplying the percent of hot water PerHot found by equation (d) by the maximum flow rate $Q_{Max}$. Next, the theoretical cold water flow rate $Q_C$ is determined by subtracting the hot water flow rate $Q_H$ from the maximum flow rate $Q_{Max}$, as shown in equation (f) of block 218.

Next, the process continues to block 220 where in equation (a) the controller 36 finds the coefficient of valve $C_{VH}$ for the hot water valve 22 by dividing flow rate $Q_H$ by the square root of the hot water pressure $P_H$. Likewise, the coefficient of valve $C_{VC}$ for the cold water valve 12 is calculated by dividing the flow rate $Q_C$ by the square root of the cold water pressure $P_C$. As is known in the art, the capacity and flow characteristics of a valve are often expressed in terms of a coefficient of valve or flow coefficient ($C_V$). It is generally understood that the value of ($C_V$) is defined as the flow of water through a valve at 60° F. in gallons/minute at a pressure drop of 1 lb./in².

After the coefficient of valves $C_{VH}$, $C_{VC}$ are found, they are used as independent variables of the linear equations (c) and (d) of block 220, which defines the relationship between valve angles, HAngle and CAngle, and coefficient of valves, $C_{VH}$ and $C_{VC}$, respectively. Using these equations, valve angles for each valve 12, 22 are generated. When the valves 12, 22 are placed at these angles HAngle and CAngle in a full mixing system 10, the system 10 will output a mixed temperature $T_M$ and a flow rate $Q_M$ equal to the mixed temperature set point $T_{Set}$ and the flow rate set point $Q_{Set}$.

Continuing to block 222, the controller 36 utilizes the valve angles HAngle and CAngle in equations (a) and (b) to calculate values for variables H-μs and C-μs, respectively. The variables H-μs and C-μs are then converted at equations (c) and (d) of block 222 to the pulse width, or duration, HDuty and CDuty in the pulse width modulation control signals 31 and 33. The process then continues to block 210 where, as detailed above, the controller 36 stores values for certain temporary variables in memory 73. More particularly, the value for $T_{Set}$ is assigned to the temporary variable $T_{set\_}$Temp, and the value for $Q_{Max}$ is assigned to the temporary variable $Q_{Set\_}$Temp. Likewise, the value for $P_H$ is assigned to the temporary variable $P_H$_Temp, the value for $P_C$ is assigned to the temporary variable $P_C$_Temp, the value for $T_H$ is assigned to the temporary variable $T_H$_Temp, and the value for $T_C$ is assigned to the temporary variable $T_C$_Temp. As detailed herein, these temporary variables are stored in memory 73 for later comparative use. The process then exits at block 211, where the main program 100 is resumed at block 112.

At block 112, the controller 36 updates the positions of the servo motors 30 and 32 based upon the calculated values of HDuty and CDuty in the feed forward function 200. More particularly, the values for the control signals 31 and 33 calculated in the feed forward routine 200 are transmitted to the servo motors 30 and 32, which respond accordingly. Next, the process continues to block 114, where the controller 36 sets the variables LCount, StableCount, $Q_{Max}$, and UseSet to 0. The process then continues to block 116, where the controller 36 reads the input sensors 34, 38, 42, 46, 52, and 56 in the manner detailed above with respect to block 106.

The process 100 continues at block 118 where the controller 36 obtains the set points $T_{Set}$ and $Q_{Set}$ in the manner detailed above with respect to block 108. The process continues to block 120, where the controller 36 determines whether the variable UseSet is equal to one. Decision block 120 generally determines whether the value of $Q_{Max}$ is equal to the user set point $Q_{Set}$ or has been calculated during additional processing, as further detailed herein. If the value of UseSet equals one, then the process continues to block 122 where $Q_{Max}$ is set to be equal to the variable $Q_{Max}$.

The process 100 then continues to block 124 where the controller 36 queries whether $Q_{Max}$ is greater than or equal to $Q_{Set}$. If so, the process 100 continues to block 126 where $Q_{Max}$ is set equal to $Q_{Set}$. In other words, if the user has set the desired flow rate $Q_{Set}$ to be less than or equal to the maximum flow rate $Q_{Max}$ of the valves 12, 22, then the controller 36 sets $Q_{Max}$ to be equal to $Q_{Set}$.

As detailed above, the variable $Q_{Max}$ is used in the feed forward function 200 to calculate flow rates of the cold water and the hot water, $Q_C$ and $Q_H$, respectively. The variable $Q_{Max}$ is set at block 126 to be the lowest of the maximum flow rate $Q_{Max}$ and the set point flow rate $Q_{Set}$. For example, if the maximum flow rate $Q_{Max}$ is 2 gallons per minute and the user desires a flow rate $Q_{Set}$ of 1 gallon per minute, then block 126 sets $Q_{Max}$ to be equal to 1 gallon per minute. If not, then the process 100 continues directly to block 128.

At decision block 128, the controller 36 queries whether a large system change has occurred. More particularly, in the illustrative embodiment, the controller 36 queries whether the hot water pressure $P_H$ or cold water pressure $P_C$ changed by at least 5 psi, whether the hot water temperature $T_H$ or cold water temperature $T_C$ changed by at least 10 degrees, whether the set temperature $T_{Set}$ changed by at least 5 degrees, and whether the maximum flow $Q_{Max}$ changed by at least 0.1 gallons per minute. If none of these events occurred, then the controller 36 determines that the system inputs are substantially stable and the process continues to decision block 130.

More particularly, at block 128 the controller 36 recalls the temporary variables, $P_H\_Temp$, $P_C\_Temp$, $T_H\_Temp$, $T_C\_Temp$, $T_{Set}\_Temp$, and $Q_{Set}\_Temp$, which are then compared to the variables $P_H$, $P_C$, $T_H$, $T_C$, $T_{Set}$, and $Q_{Max}$, respectively, to determine if a change greater than the above-identified predetermined values has occurred.

At decision block 130, the controller 36 queries whether $Q_{Max}$ is less than or equal to 0. If not, the process then continues to decision block 132. At decision block 132 the controller 36 queries whether the value of LCount equals 5, whether $T_H$ is greater than or equal to $T_{Set}$, whether $T_C$ is less than or equal to $T_{Set}$, and whether $Q_{Max}$ is not equal to 0. If any one of these conditions is not true, then the process continues to block 134 where a counter variable LCount is incremented by 1. Generally speaking, block 134 provides a loop counter such that a predetermined amount of time passes where substantially stable inputs are supplied to the system 10 before the controller 36 enters the feed back function 300 at decision block 136.

If decision block 132 is answered in the affirmative, the process 100 continues to decision block 136. At decision block 136, the feed back function 300 of FIG. 8 is activated beginning at starting block 302. As noted above, the feed back function 300 is only active if a small change to system inputs is needed to correct the output and after the feed forward function 200 has been inactive for a predetermined period of time. Illustratively, the feed back function 300 alters the valve position of both the hot and cold water valves 12 and 22 in equal magnitudes and opposite directions. The magnitude of the change is based on the set temperature $T_{Set}$ and the measured mixed water temperature $T_M$. For large differences, the change in valve position is relatively large and for small differences the change in valve position is relatively small. Illustratively, the feed back function 300 operates until the measured mixed water temperature $T_M$ is within approximately 1 degree of the set temperature $T_{Set}$.

Returning to FIG. 9, after entering the feed back function 300 at start block 302, the controller 36 continues to decision block 304, where it queries whether the absolute value of the differential $T_{Set}$ minus $T_M$ is greater than 0. If so, then the process 300 continues to block 306 when the controller 36 sets the variable pSpeed to be equal to 0. If not, then the process 300 immediately continues to decision block 308, where the controller 36 queries whether the absolute value of the differential $T_{Set}$ minus $T_M$ is greater than 1 degree. If so, the process 300 continues to block 310, where the controller 36 sets the variable pSpeed to be equal to 0.2. If not, then the process immediately continues to decision block 312. At decision block 312, the controller 36 determines whether the absolute value of the differential $T_{Set}$ minus $T_M$ is greater than 3 degrees. If so, then the process 300 continues to block 314, where the controller 36 sets the variable pSpeed to be equal to 0.5. If not, then the process 300 immediately continues to decision block 316, where the controller 36 queries whether the absolute value of the differential $T_{Set}$ minus $T_M$ is greater than 5 degrees. If so, then the process 300 continues to block 318, where pSpeed is set to be 0.7. If not, then the process 300 immediately continues to block 320, where the controller 36 queries whether the absolute value of the differential $T_{Set}$ minus $T_M$ is greater than 10 degrees. If so, the process 300 continues to block 322 where the controller sets the variable pSpeed to be equal to 1. If not, then the process 300 immediately continues to block 324.

At block 324, the controller 36 queries whether $T_M$ is less than or equal to $T_{Set}$ minus 1. If $T_M$ is not less than or equal to $T_{Set}$ minus 1, then the process 300 continues to decision block 326 where the controller 36 queries whether $T_M$ is greater than or equal to $T_{Set}$ plus 1. If decision block 326 is answered in the negative, then the mixed water temperature $T_M$ is within 1 degree of the set water temperature $T_{Set}$ and the process continues to block 328 without any adjustment values being calculated for either the cold water servo motor 30 or the hot water servo motor 32. At block 328, the controller 36 stores values for certain temporary variables in memory 73. More particularly, the value for $T_{Set}$ is assigned to the temporary variable $T_{Set}\_Temp$, and the value for $P_H$ is assigned to the temporary variable $P_H\_Temp$. Similarly, the value for $T_H$ is assigned to the temporary variable $T_H\_Temp$, and the value for $T_C$ is assigned to the temporary variable $T_C\_Temp$. As detailed herein, these temporary variables are stored in memory 73 for later comparative use. The feedback function 300 then exits at block 338, where the main program 100 is resumed at block 138.

Returning to decision block 324, if the mixed water temperature $T_M$ is determined to be less than or equal to the value of $T_{Set}$ minus 1, then the process continues to block 330. In this situation, the mixed water temperature $T_M$ is more than 1 degree below the set water temperature $T_{Set}$. At block 330, the angle of the hot water valve 22 is increased by the variable pSpeed and the angle of the cold water valve 12 is decreased by the variable pSpeed. The process 300 continues at decision block 332 where the values of HDuty and CDuty are calculated in the manner detailed above with respect to block 222. The feedback function 300 then exits at block 338, where the main program 100 is resumed at block 138.

Returning now to decision block 326, if the value of $T_M$ is determined to be greater than or equal to the value $T_{Set}$ plus 1, then the process 300 continues to block 334. In other words, if the mixed water temperature $T_M$ is more than 1 degree above the value of the set temperature $T_{Set}$, then the process 300 continues to block 334 where the value of HAngle is decreased by pSpeed and the value of CAngle is increased by pSpeed. The process then continues at block 336 where the values of HDuty and CDuty are calculated in the manner detailed above with respect to block 222.

As noted above, the feed back function 300 exits at block 338 and returns to the main control function 100. The process 100 then continues at block 138 where the position of the servo motors 30 and 32 are updated in a manner similar to that detailed above with respect to block 112. At block 140, the variable LCount is reset to 0. The process then continues to block 152 for the restriction compensation function as detailed below.

Returning now to decision block 130, if $Q_{Max}$ is determined to be less than or equal to 0, then no water is set to flow through either valve 12 or 22. As such, at block 142, both variables HDuty and CDuty are set to 47; which is the predetermined valve off position. At block 144, the modulated pulse width control signal 31, 33 is sent to the respective motors 30, 32, which then place the valves 12, 22 in their off or closed positions. The process then continues to block 152 for the restriction compensation function as detailed below.

Returning now to decision block 128, if a large system input change occurs, then the process continues to decision block 146. More particularly, if the hot water pressure $P_H$ or cold water pressure $P_C$ changes by at least 5 psi, if the hot water temperature $T_H$ or cold water temperature $T_C$ changes by at least 10 degrees, if the set water temperature $T_{Set}$ changes by more than 5 degrees, or if the maximum flow rate $Q_{Max}$ changes by more than 0.1 gallons per minute, then the process 100 continues to block 146, where the variable UseSet is set equal to 1 and the variable StableCount is set equal to 0. The process then continues to decision block 148, where the feed forward function 200 is initiated. The feed forward function 200 was described in detail above in connection with block 110. At block 150, the motors 30 and 32 are updated in the manner detailed above with respect to block 112. Next, the process 100 continues at block 152 where the restriction compensation function 400 of FIG. 10 is initiated.

The restriction compensation function 400 adjusts the sum of both valve restrictions to match the outlet restriction 60. A theoretical maximum flow rate $Q_{M\_Comp}$ is calculated based on the $C_V$s of both valves 12 and 22 and the mixed water pressure $P_M$. The position of each valve 12 and 22 is then decreased in equal magnitude and direction. The function 400 continues to run until the theoretical maximum flow rate decreases. At this point, the restriction of the valves 12 and 22 is equal to the outlet restriction 60. This function prevents the occurrence of large temperature spikes.

The restriction compensation function 400 begins at start block 402 and proceeds to block 404, where the theoretical flow rate $Q_{M\_Comp}$ is determined. The theoretical flow rate $Q_{M\_Comp}$ equals the equation:

$$(C_{VH} * \sqrt{(P_H - P_M)}) + (C_{VC} * \sqrt{(P_C - P_M)}).$$

The process 400 then continues to decision block 406 where the controller 36 queries whether the variable StableCount equals a predetermined value, illustratively five. If StableCount is not equal to five, then the process continues to block 408, where the variable StableCount is incremented by one. Generally, the blocks 406 and 408 function as a counter loop, requiring the restriction compensation adjustment to wait five processing loops before it acts. As such, it should be appreciated that the counter loop could be eliminated if no wait is desired before restriction compensation occurs.

If the variable StableCount equals five, then the process continues to block 410, where the controller 36 determines whether the value of $Q_{M\_Comp}+1$ is less than $Q_{Max}$. If $Q_{M\_Comp}+1$ is not less than $Q_{Max}$, then the process continues to block 412. It should be noted that at block 410 $Q_{M\_Comp}+1$ is utilized, as opposed to $Q_{M\_Comp}$, in order to prevent $Q_{Max}$ from being set to an unacceptably low value. At block 412, the controller 36 queries whether $P_M$ is less than 5. If not, then the process continues to block 414 where StableCount is set to zero. If at block 412 the controller 36 determines that $P_M$ is less than 5, then the process continues at block 416 where $Q_{Max}$ is set equal to $Q_{Set}$. In other words, blocks 412 and 416 cooperate to set the value of $Q_{Max}$ to the user interface set point $Q_{Set}$ when the flow rate decreases below the restriction flow rate. Moreover, if the mix pressure $P_M$ drops below a certain value (for example, 5 psi), then there is little back pressure due to the restriction 60. As such, the user interface flow rate value $Q_{Set}$ may be used. The process then continues to block 414.

Returning to block 410, if the controller 36 determines that $Q_{M\_Comp}+1$ is less than $Q_{Max}$, then the process continues to block 418. At block 418, the value of $Q_{Max}$ is set to be equal to 0.95 of $Q_{Max}$. In other words, $Q_{Max}$ is decreased by 5 percent. The process continues to block 414. The restriction compensation function 400 exits at block 420 and returns to block 116 of the main program 100.

The restriction compensation function 400 at blocks 410 and 418 will continue to compensate for the restriction 60 by decreasing $Q_{Max}$ until it is nearly equal to $Q_{M\_Comp}$ (i.e., until $Q_{M\_Comp}+1$ is not less than $Q_{Max}$). As an illustrative example, if a user is filling a tub at 10 gallons per minute (gpm) with no restriction, the value of $Q_{Max}$ is 10 gpm. If the user then switches to a shower head comprising a restriction 60, and thereby reducing the water flow to 2.5 gpm, then the pressure across the valves 12 and 22 changes and $Q_{M\_Comp}$ is equal to 2.5 gpm. At block 410, the controller 36 determines that $Q_{M\_Comp}+1$ (3.5 gpm) is less than 10 gpm. As such, the controller reduces the value of $Q_{Max}$ at block 418. This process continues until $Q_{Max}$ is equal to 3.5 gpm. If the user should set $Q_{Max}$ at a low flow rate (e.g., 1 gpm), then blocks 417 and 416 cooperate to set the value of $Q_{Max}$ equal to $Q_{Set}$.

Although the invention has been described in detail with reference to certain preferred embodiments, variations and modifications exist within the spirit and scope of the invention as described and defined in the following claims.

The invention claimed is:

1. A water delivery system for connection to a cold water source, a hot water source and a mixed water outlet, and for providing a mixed water of a desired water temperature to the mixed water outlet, the water delivery system comprising:
   a cold water valve adapted to be coupled to the cold water source for receiving cold water, and having a cold water outlet;
   a hot water valve adapted to be coupled to the hot water source for receiving hot water, and having a hot water outlet;
   a fluid mixer configured to receive cold water from the cold water outlet, to receive hot water from the hot water outlet, and to provide a mixed water to the mixed water outlet; and
   a controller operably coupled to the cold water valve and the hot water valve, the controller being configured to adjust the cold water valve and the hot water valve to regulate a mixed water temperature of the mixed water to substantially correspond to the desired water temperature, the controller being further configured to regulate the mixed water temperature based on at least one characteristic of the cold water, at least one characteristic of the hot water, and at least one characteristic of the mixed water, wherein the controller operates alternatively in a feed forward manner and a feed back manner, the feed forward manner providing for the adjustment of the cold water valve and the hot water valve based on the at least one characteristic of the hot water and the at least one characteristic of the cold water, and the feed back manner providing for the adjustment of the cold water valve and the hot water valve based on the at least one characteristic of the mixed water, the controller operating in the feed forward manner when at least one of the cold water and the hot water is unstable.

2. The water delivery system of claim 1, wherein the controller operates in the feed back manner only when both the cold water and the hot water are stable.

3. The water delivery system of claim 1, wherein the cold water is unstable when at least one characteristic of the cold water changes by at least a predetermined value, and the hot water is unstable when at least one characteristic of the cold water changes by at least a predetermined value.

4. The water delivery system of claim 1, wherein the at least one characteristic of the cold water includes at least one of the temperature of the cold water and the pressure of the cold water, the at least one characteristic of the hot water includes at least one of the temperature of the hot water and the pressure of the hot water, and the at least one characteristic of the mixed water includes at least one of the temperature of the mixed water and the pressure of the mixed water.

5. The water delivery system of claim 4, further comprising a cold water temperature sensor positioned to measure the temperature of the cold water, a cold water pressure sensor positioned to measure the pressure of the cold water, a hot water temperature sensor positioned to measure the temperature of the hot water, a hot water pressure sensor positioned to measure the pressure of the hot water, a mixed water temperature sensor configured to measure the temperature of the mixed water, and a mixed water pressure sensor configured to measure the pressure of the mixed water.

6. The water delivery system of claim 1, wherein the controller is further configured to operate in the feed forward manner when the desired water temperature is unstable by changing by at least a predetermined value.

7. The water delivery system of claim 6, wherein the controller returns to operation in the feed forward manner if at least one of the cold water and the hot water become unstable.

8. The water delivery system of claim 1, wherein the controller operates in the feed forward manner from an initial opening of at least one of the hot water valve and the cold water valve, and switches to operation in the feed back manner only after both the hot water and the cold water are stable for a predetermined time.

9. The water delivery system of claim 1, further comprising:
a cold water servo motor coupled to the cold water valve and configured to control the position of the cold water valve;
a hot water servo motor coupled to the hot water valve and configured to control the position of the hot water valve; and
wherein the controller is configured to generate a cold water pulse width modulated signal to control the cold water servo motor for positioning the cold water valve, and to generate a hot water pulse width modulated signal to control the hot water servo motor for positioning the hot water valve.

10. The water delivery system of claim 1, further comprising:
an outlet restriction in fluid communication with the mixed water outlet,
an outlet pressure sensor coupled to the mixed water outlet and configured to measure the pressure of the mixed water; and
wherein the controller is configured to adjust the cold water valve and the hot water valve based on the pressure of the mixed water in order to actively compensate for the outlet restriction.

11. A method of controlling a water delivery system to provide a mixed water to a mixed water outlet, the water delivery system having a cold water valve connected to a cold water source, a hot water valve connected to a hot water source, and a mixer for combining cold water from the cold water valve and hot water from the hot water valve, the mixer being connected to the mixed water outlet, the method comprising the steps of:
receiving an input representing a desired temperature of the mixed water being provided to the mixed water outlet;
monitoring at least one characteristic of the cold water provided to the cold water valve, at least one characteristic of the hot water provided to the hot water valve, and at least one characteristic of the mixed water provided to the mixed water outlet;
controlling the cold water valve and the hot water valve in a feed forward manner if at least one of the cold water and the hot water is unstable; and
controlling the cold water valve and the hot water valve in a feed back manner only if both the cold water and the hot water are stable.

12. The method of claim 11, wherein the cold water source is unstable when at least one characteristic of the hot water source changes by at least a predetermined value, and the hot water source is unstable when at least one characteristic of the cold water source changes by at least a predetermined value.

13. The method of claim 11, wherein the at least one characteristic of the cold water source includes the temperature of the cold water and the pressure of the cold water, and the at least one characteristic of the hot water source includes the temperature of the hot water and the pressure of the hot water.

14. The method of claim 11, wherein the controller operates in the feed forward manner from an initial opening of at least one of the hot water valve and the cold water valve, and switches to operation in the feed back manner only after both the hot water source and the cold water source are stable for a predetermined time.

15. The method of claim 14, wherein the controller returns to operation in the feed forward manner if at least one of the cold water source and the hot water source become unstable.

16. The method of claim 11, further comprising the steps of:
measuring the pressure of the mixed water; and
adjusting the cold water valve and the hot water valve in response to the measured pressure to compensate for a restriction coupled to the mixed water outlet.

17. A water delivery system for connection to a cold water source, a hot water source and a mixed water outlet, and for providing a mixed water of a desired water temperature to the mixed water outlet, the water delivery system comprising:
a cold water valve adapted to be coupled to the cold water source for receiving cold water, and having a cold water outlet;
a cold water temperature sensor configured to measure the temperature of the cold water supplied to the cold water valve from the cold water source and to provide a cold water temperature signal indicative thereof;
a cold water pressure sensor configured to measure the pressure of the cold water supplied to the cold water valve from the cold water source and to provide a cold water pressure signal indicative thereof;
a hot water valve adapted to be coupled to the hot water source for receiving hot water, and having a hot water outlet;
a hot water temperature sensor configured to measure the temperature of the hot water supplied to the hot water valve from the hot water source and to provide a hot water temperature signal indicative thereof;

a hot water pressure sensor configured to measure the pressure of the hot water supplied to the hot water valve from the hot water source and provide a hot water pressure signal indicative thereof;

a user input device configured to receive the desired temperature from the user and to provide a set temperature signal indicative of the desired temperature; and a controller operably coupled to the cold water temperature sensor, the cold water pressure sensor, the hot water temperature sensor, the hot water pressure sensor, the cold water valve and the hot water valve, the controller being configured to adjust the cold water valve and the hot water valve to regulate a mixed water temperature of the mixed water to substantially correspond to the desired water temperature by operating alternatively in a feed forward manner and a feed back manner, wherein the controller is configured to regulate the mixed water temperature in the feed forward manner by adjusting the cold water valve and the hot water valve in response to the cold water temperature signal, the cold water pressure signal, the hot water temperature signal, the hot water pressure signal, and the set temperature signal.

18. The water delivery system of claim 17, further comprising a fluid mixer configured to receive cold water from the cold water outlet, to receive hot water from the hot water outlet, and to provide a mixed water to the mixed water outlet.

19. The water delivery system of claim 17, wherein the controller operates in the feed forward manner when at least one of the cold water and the hot water is unstable.

20. The water delivery system of claim 19, wherein the cold water is unstable when at least one characteristic of the cold water changes by at least a predetermined value, and the hot water is unstable when at least one characteristic of the cold water changes by at least a predetermined value.

21. The water delivery system of claim 20, wherein the at least one characteristic of the cold water includes at least one of the temperature of the cold water and the pressure of the cold water, the at least one characteristic of the hot water includes at least one of the temperature of the hot water and the pressure of the hot water, and the at least one characteristic of the mixed water includes at least one of the temperature of the mixed water and the pressure of the mixed water.

22. The water delivery system of claim 17, wherein the feed back manner providing for the adjustment of the cold water valve and the hot water valve is based on the at least one characteristic of the mixed water.

23. The water delivery system of claim 17, wherein the controller operates in the feed back manner only when both the cold water and the hot water are stable.

24. The water delivery system of claim 17, further comprising:

a cold water servo motor coupled to the cold water valve and configured to control the position of the cold water valve;

a hot water servo motor coupled to the hot water valve and configured to control the position of the hot water valve; and wherein the controller is configured to generate a cold water pulse width modulated signal to control the cold water servo motor for positioning the cold water valve, and to generate a hot water pulse width modulated signal to control the hot water servo motor for positioning the hot water valve.

25. The water delivery system of claim 17, further comprising:

an outlet restriction in fluid communication with the mixed water outlet, an outlet pressure sensor coupled to the mixed water outlet and configured to measure the pressure of the mixed water; and wherein the controller is configured to adjust the cold water valve and the hot water valve based on the pressure of the mixed water in order to actively compensate for the outlet restriction.

26. The proportioning valve system of claim 17, further comprising:

a mixed water temperature sensor configured to measure the temperature of water supplied to the mixed water outlet and provide a mixed water temperature signal indicative thereof;

wherein the controller is configured to adjust in a feedback manner the cold water valve and the hot water valve in response to the mixed water temperature signal.

27. The proportioning valve system of claim 17, further comprising:

a mixed water pressure sensor configured to measure the pressure of water supplied to the mixed water outlet and provide a mixed water pressure signal indicative thereof; and wherein the controller is configured to compensate for restrictions to the mixed water flow in response to the mixed water pressure signal.

* * * * *